(12) United States Patent
Ishii

(10) Patent No.: US 9,906,448 B2
(45) Date of Patent: Feb. 27, 2018

(54) COMMUNICATION SYSTEM, CONTROL DEVICE, NODE CONTROLLING METHOD, AND PROGRAM

(75) Inventor: Shuji Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 142 days.

(21) Appl. No.: 13/992,652

(22) PCT Filed: Aug. 29, 2011

(86) PCT No.: PCT/JP2011/004783
§ 371 (c)(1),
(2), (4) Date: Jun. 7, 2013

(87) PCT Pub. No.: WO2012/077259
PCT Pub. Date: Jun. 14, 2012

(65) Prior Publication Data
US 2013/0250799 A1    Sep. 26, 2013

(30) Foreign Application Priority Data
Dec. 10, 2010    (JP) .................................. 2010-275668

(51) Int. Cl.
*H04L 12/50* (2006.01)
*H04L 12/741* (2013.01)
*H04L 12/801* (2013.01)

(52) U.S. Cl.
CPC ............ *H04L 45/745* (2013.01); *H04L 47/12* (2013.01)

(58) Field of Classification Search
CPC ...... H04L 45/745; H04L 12/741; H04L 47/12
(Continued)

(56) References Cited

U.S. PATENT DOCUMENTS

2001/0055277 A1\* 12/2001 Steely, Jr. ............... H04L 47/29
                                                                                    370/236
2003/0158965 A1    8/2003 Koester
(Continued)

FOREIGN PATENT DOCUMENTS

CN          1833414 A      9/2006
EP      1 195 952 A1      4/2002
(Continued)

OTHER PUBLICATIONS

Open Flow Switch Specification Version 1.0.0 (Wire Protocol 0x0]) Dec. 31, 2009 Spec contributed by: Pfaff et al.\*
(Continued)

*Primary Examiner* — Andrew Chriss
*Assistant Examiner* — Atique Ahmed
(74) *Attorney, Agent, or Firm* — Sughrue Mion, PLLC

(57) ABSTRACT

A communication system reduces load on a control device managing centralized control of a plurality of nodes. The communication system includes nodes and a control device. On receipt of a packet, each node references a table including a plurality of processing rules concerning packet processing to process the received packet in accordance with at least one processing rule corresponding to the received packet. If the corresponding processing rule is not known, each node transmits a processing rule setting request. On receipt of the processing rule setting request, the control device sets a packet processing rule in at least one of the nodes. A request staying unit that transiently stays the setting request to the control device is provided in such one or more nodes.

26 Claims, 21 Drawing Sheets

(58) Field of Classification Search
USPC .................. 370/252, 230.1, 392, 235
See application file for complete search history.

(56) References Cited

U.S. PATENT DOCUMENTS

| | | | | |
|---|---|---|---|---|
| 2005/0058149 | A1* | 3/2005 | Howe | H04L 47/10 370/428 |
| 2006/0092940 | A1 | 5/2006 | Ansari et al. | |
| 2006/0245359 | A1* | 11/2006 | Hosein | H04L 47/10 370/235 |
| 2007/0147374 | A1* | 6/2007 | Lee | H04L 12/1877 370/390 |
| 2008/0049620 | A1* | 2/2008 | Riga | G01D 9/005 370/236 |
| 2008/0310340 | A1 | 12/2008 | Isozu | |
| 2010/0046532 | A1 | 2/2010 | Okita | |
| 2011/0267954 | A1* | 11/2011 | Seetharaman et al. | 370/241 |
| 2011/0273988 | A1* | 11/2011 | Tourrilhes | H04L 41/0816 370/237 |

FOREIGN PATENT DOCUMENTS

| | | |
|---|---|---|
| EP | 1 653 688 A1 | 5/2006 |
| EP | 2 157 746 A1 | 2/2010 |
| WO | WO 2008/095010 A1 | 8/2008 |
| WO | WO 2010/103909 A1 | 9/2010 |

OTHER PUBLICATIONS

The Open Flow Switch Specification version 1.0.0, published on Dec. 31, 2009 the Open Flow Switch Consortium.*
International Search Report in PCT/JP2011/004783 dated Oct. 18, 2011.
Nick McKeown et al, "OpenFlow: Enabling Innovation in Campus Networks", [last retrieved on Oct. 6, 2010] Mar. 14, 2008, Internet <URL: http://www.openflowswitch.org//documents/ openflow-wp-latest.pdf>.
"OpenFlow Switch Specification" Version 1.1.0. (Wire Protocol 0x01) [last retrieved on Oct. 6, 2010] Dec. 31, 2009 Internet <URL: http://www.openflowswitch.org/documents/openflow-spec-v1.0.0. pdf>.
Hiroshi Ueno, et al., "A Study on Deployment of Network Appliance Functionalities in Datacenter Network", IEICE Technical Report, Nov. 13, 2009, vol. 109, No. 296, pp. 7-12, pp. 8-9 [2. Kanren kenkyu].
Chinese Office Action dated Jan. 19, 2015.
European Search Report dated Aug. 4, 2014.

* cited by examiner

[Fig. 1]
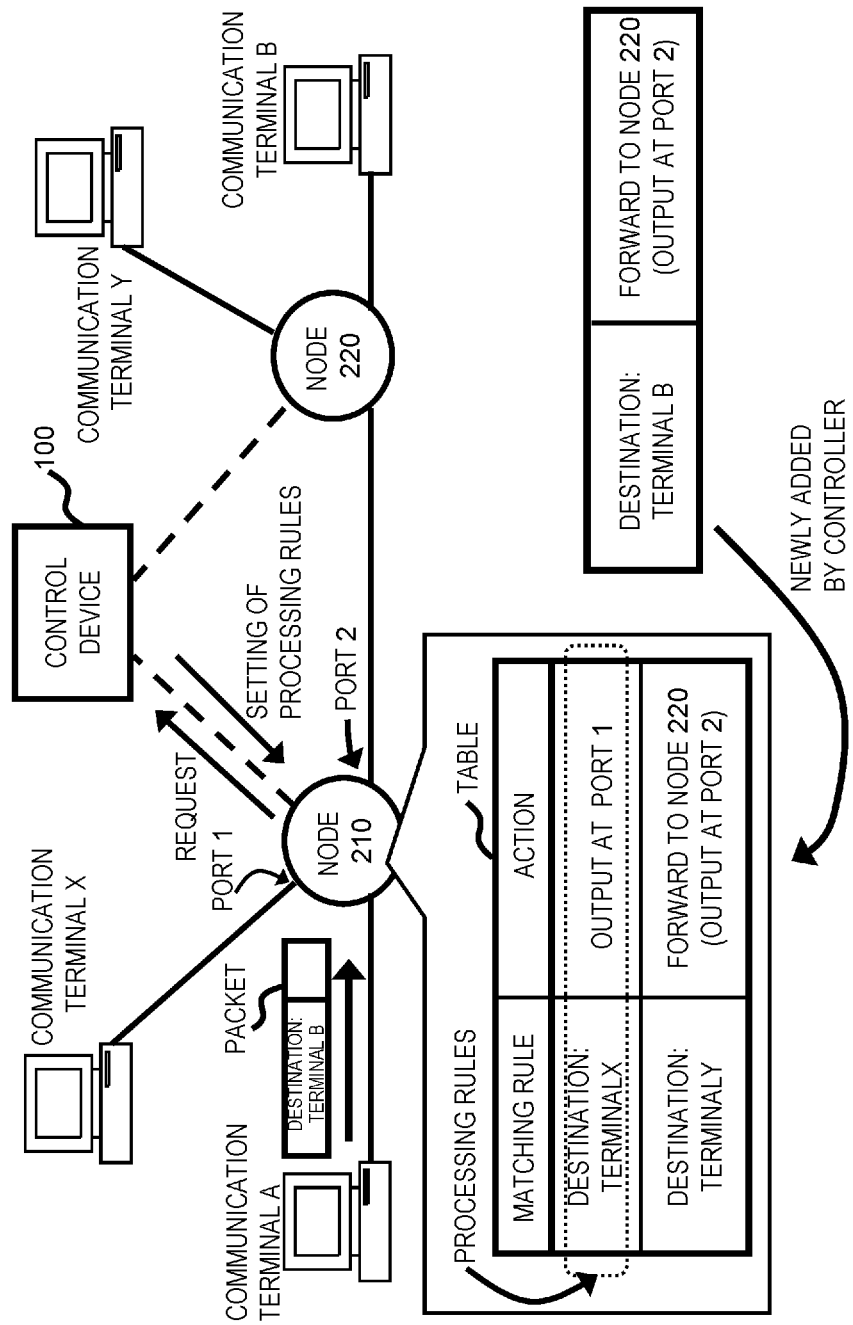

[Fig. 2]
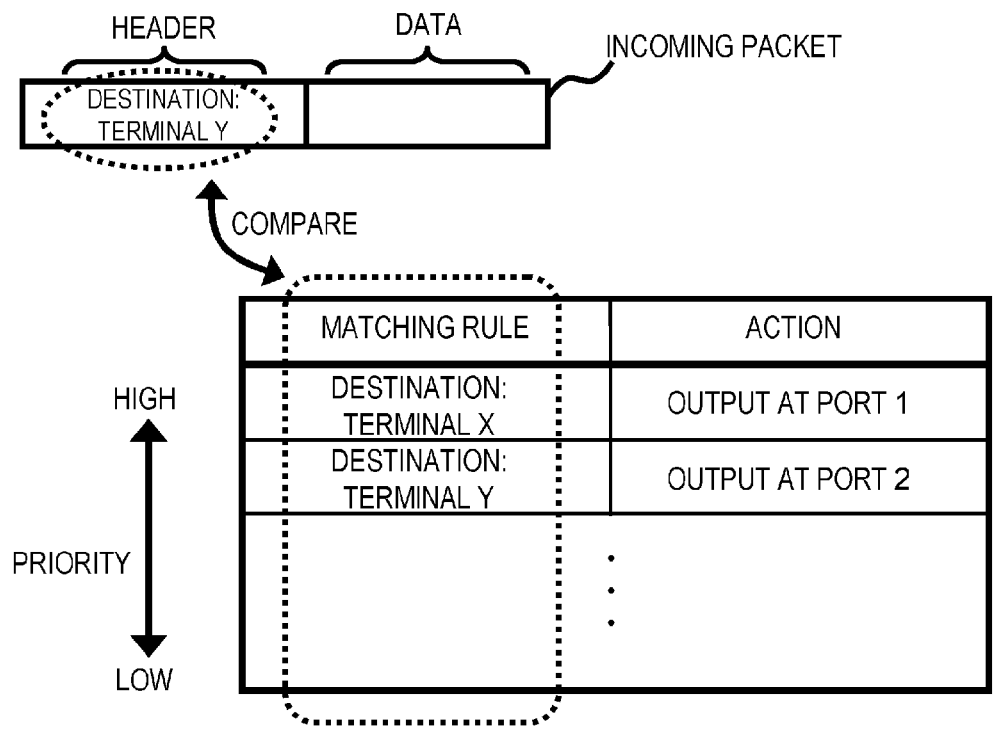

[Fig. 3]
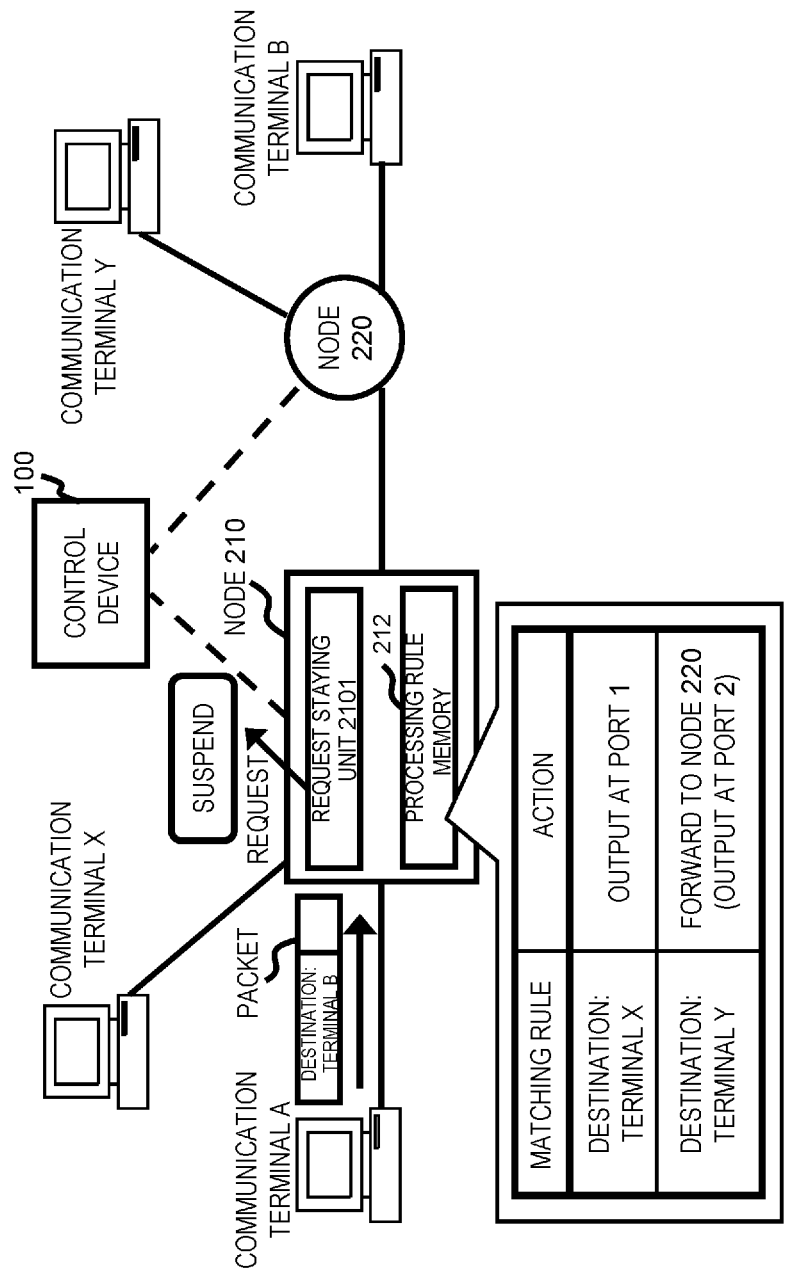

[Fig. 4]
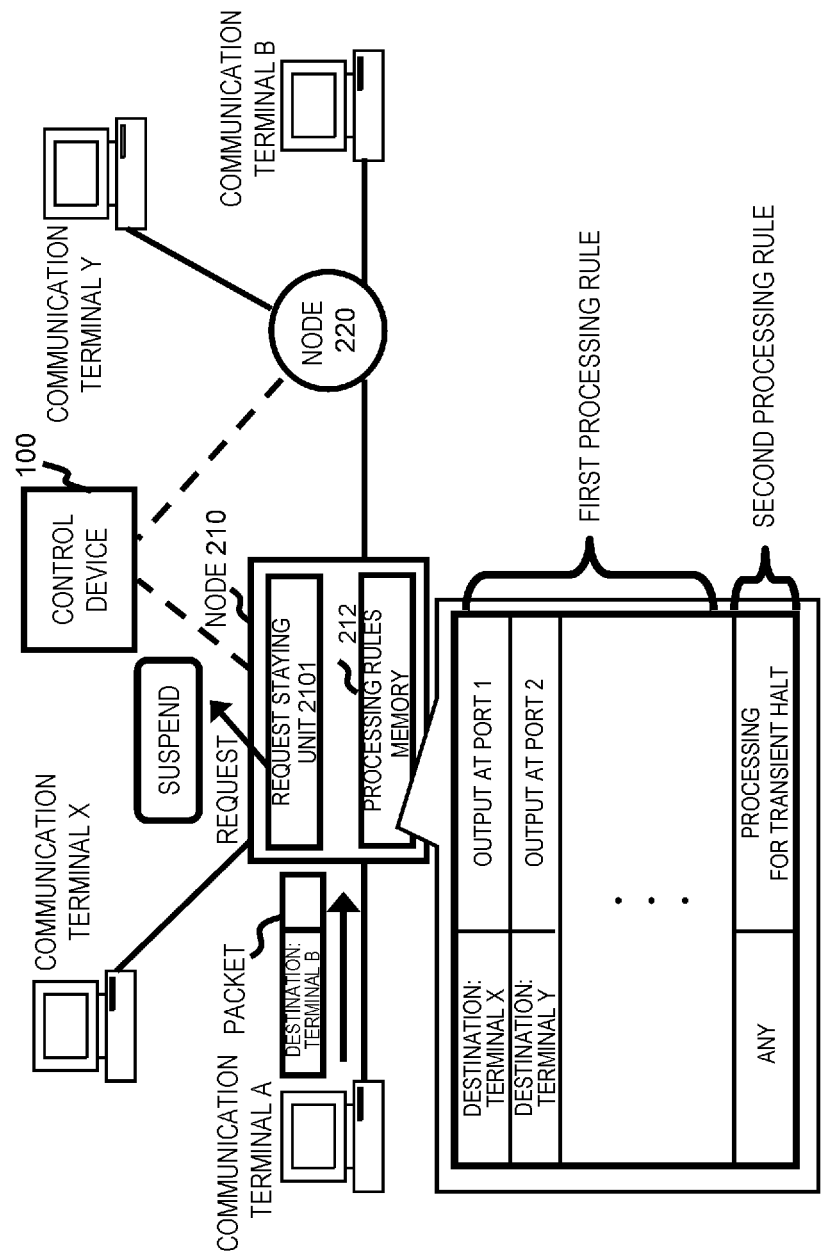

[Fig. 5]
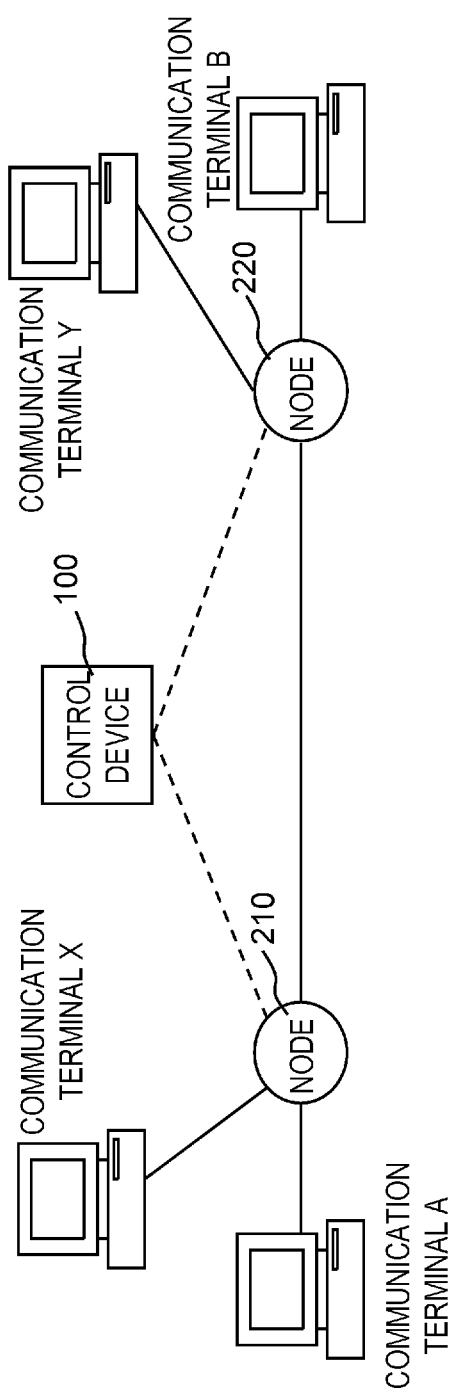

[Fig. 6]
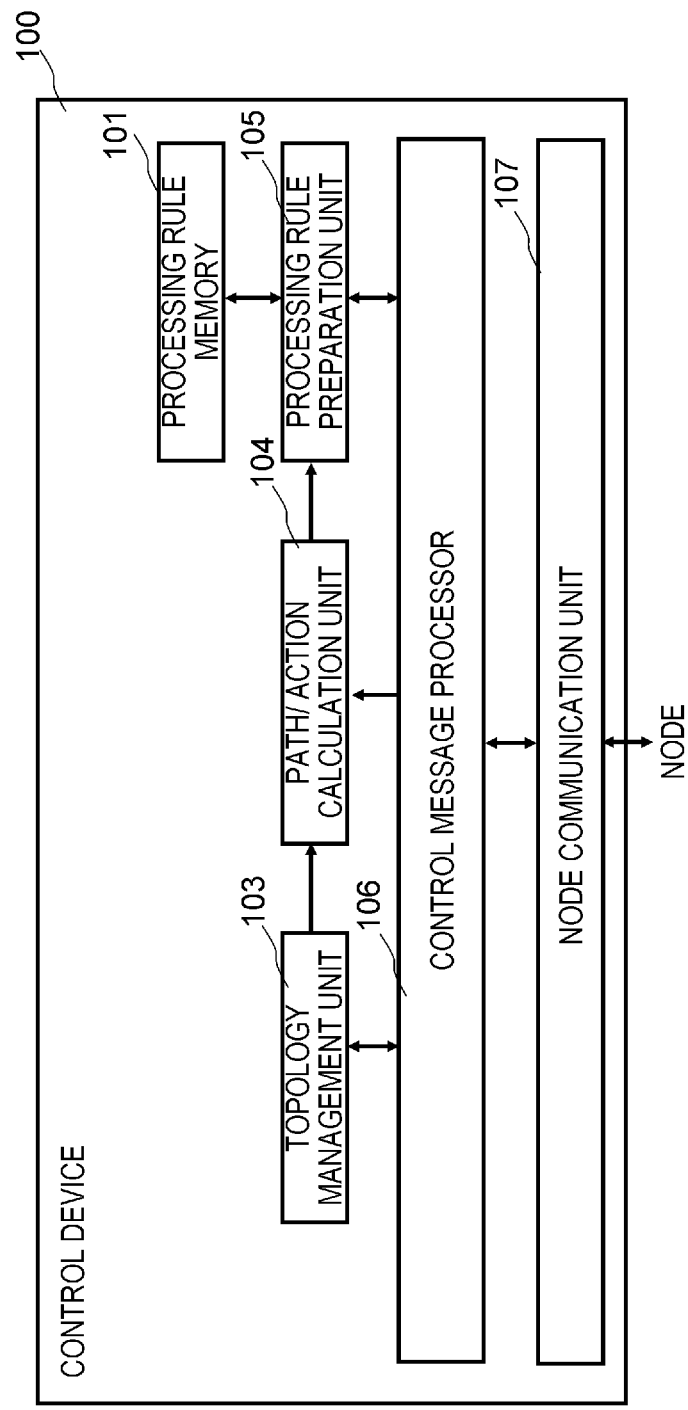

[Fig. 7]
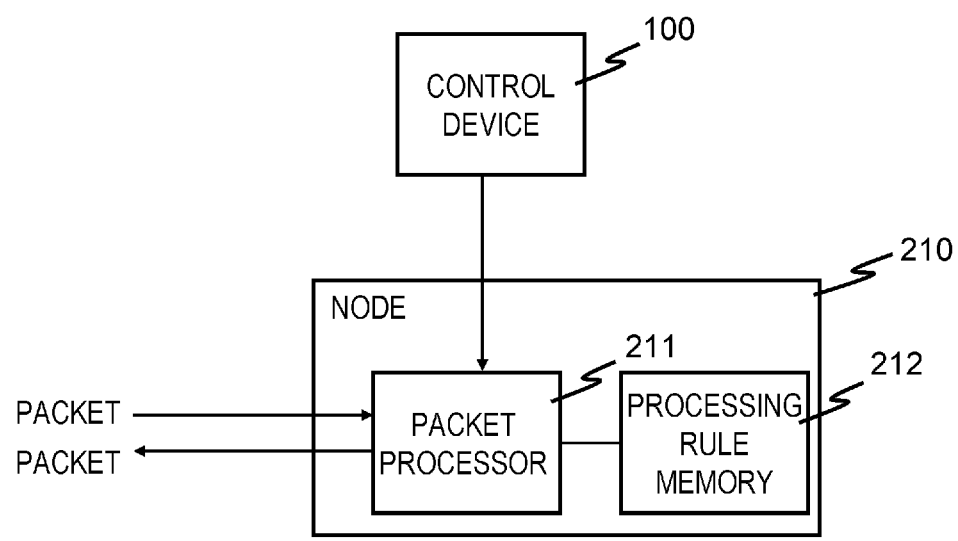

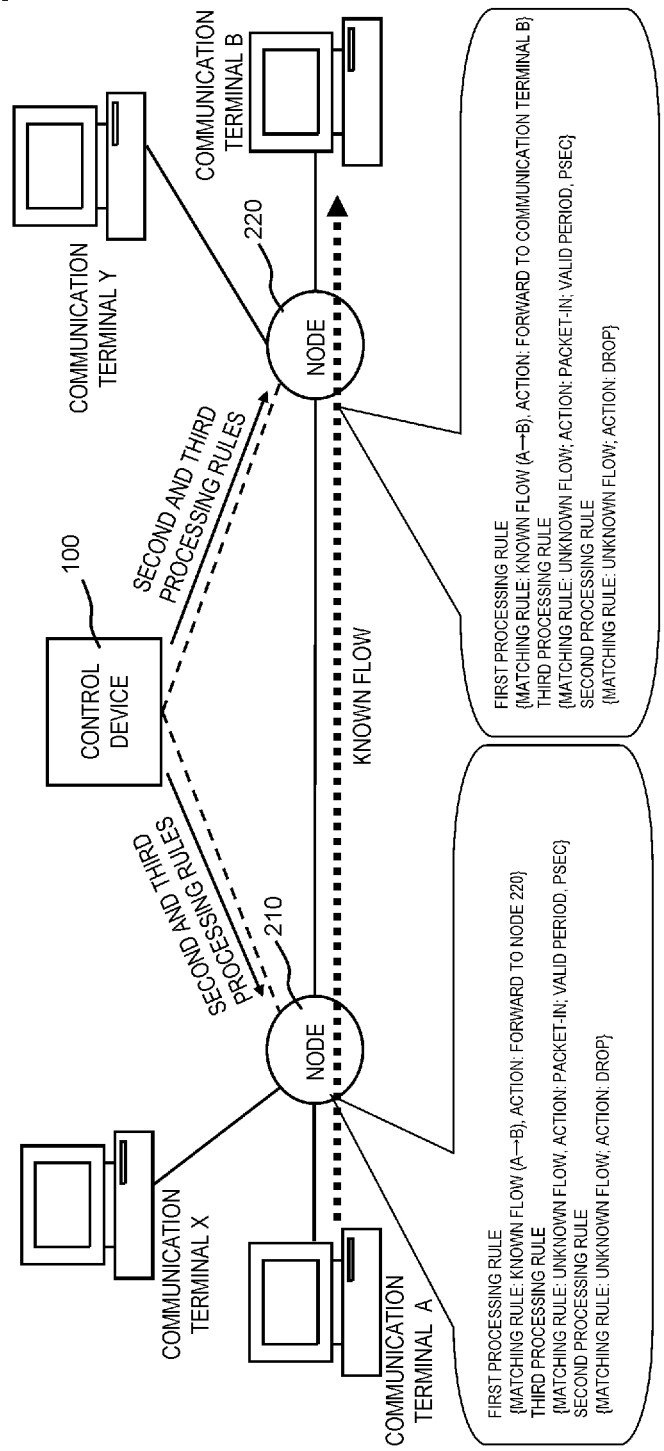
[Fig. 8]

[Fig. 9]
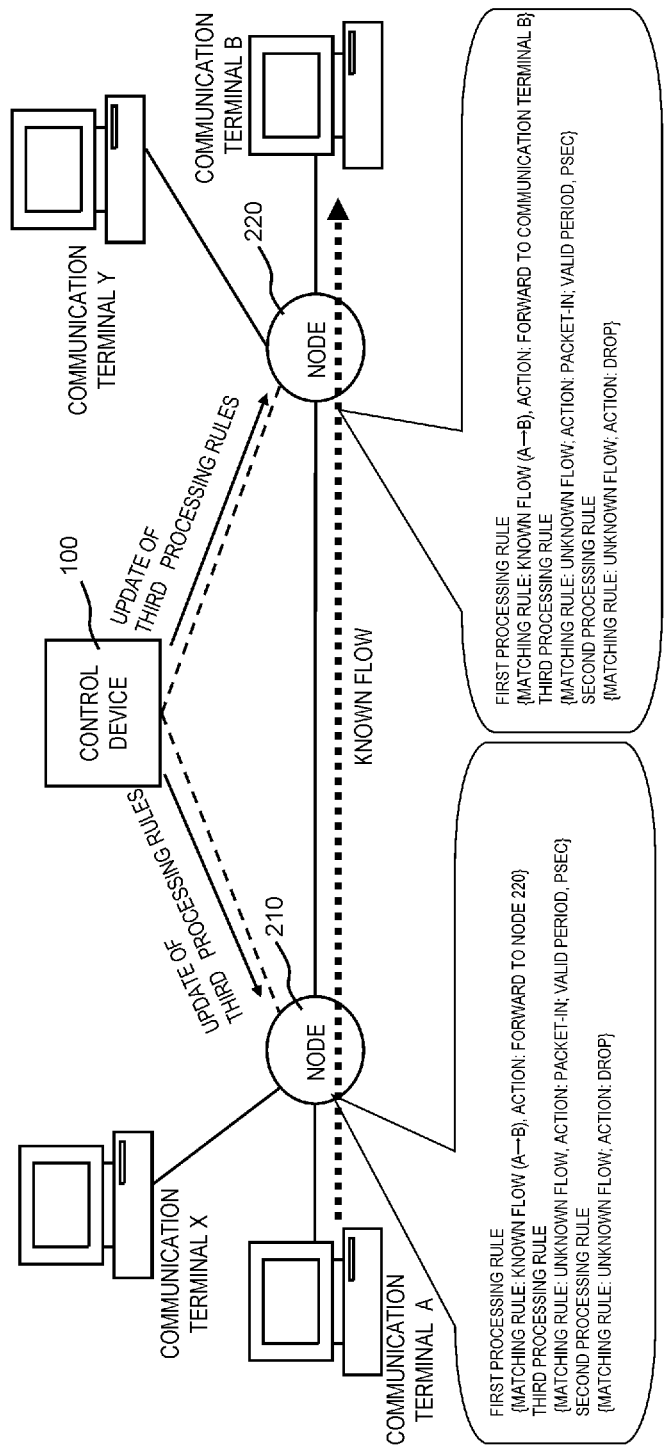

[Fig. 10]
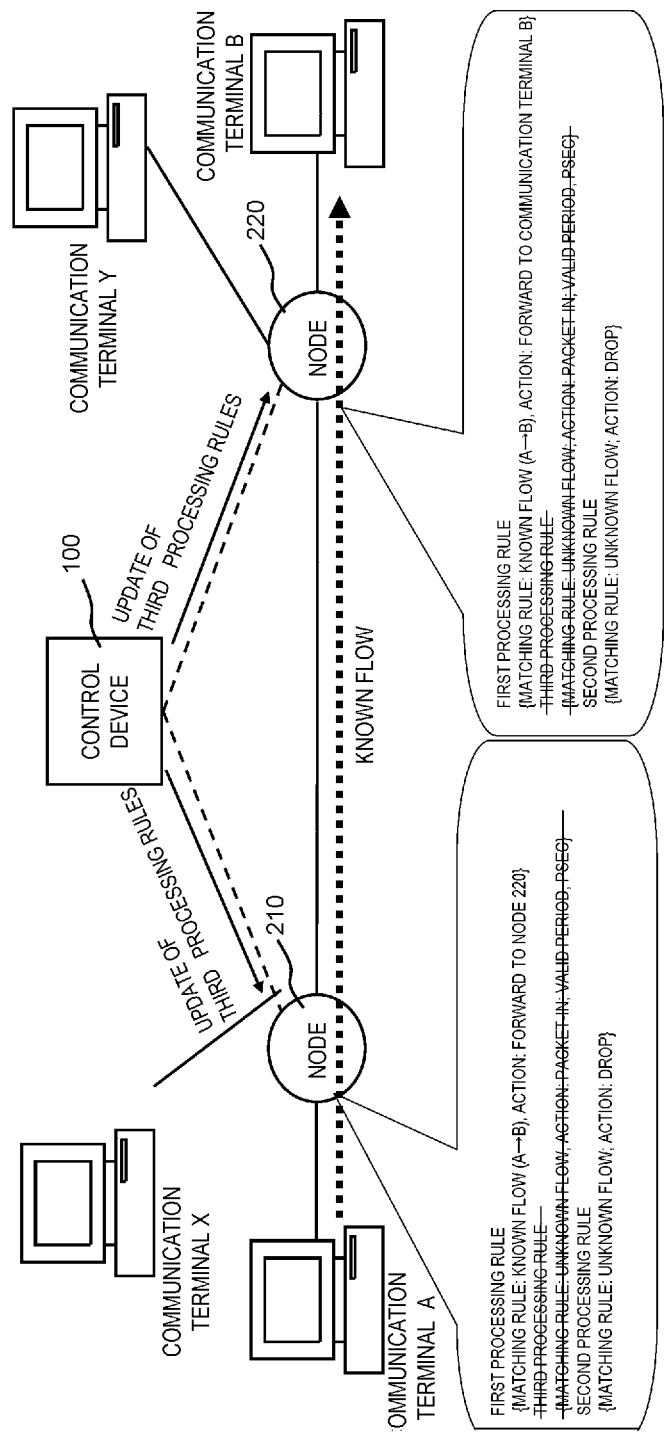

[Fig. 11]
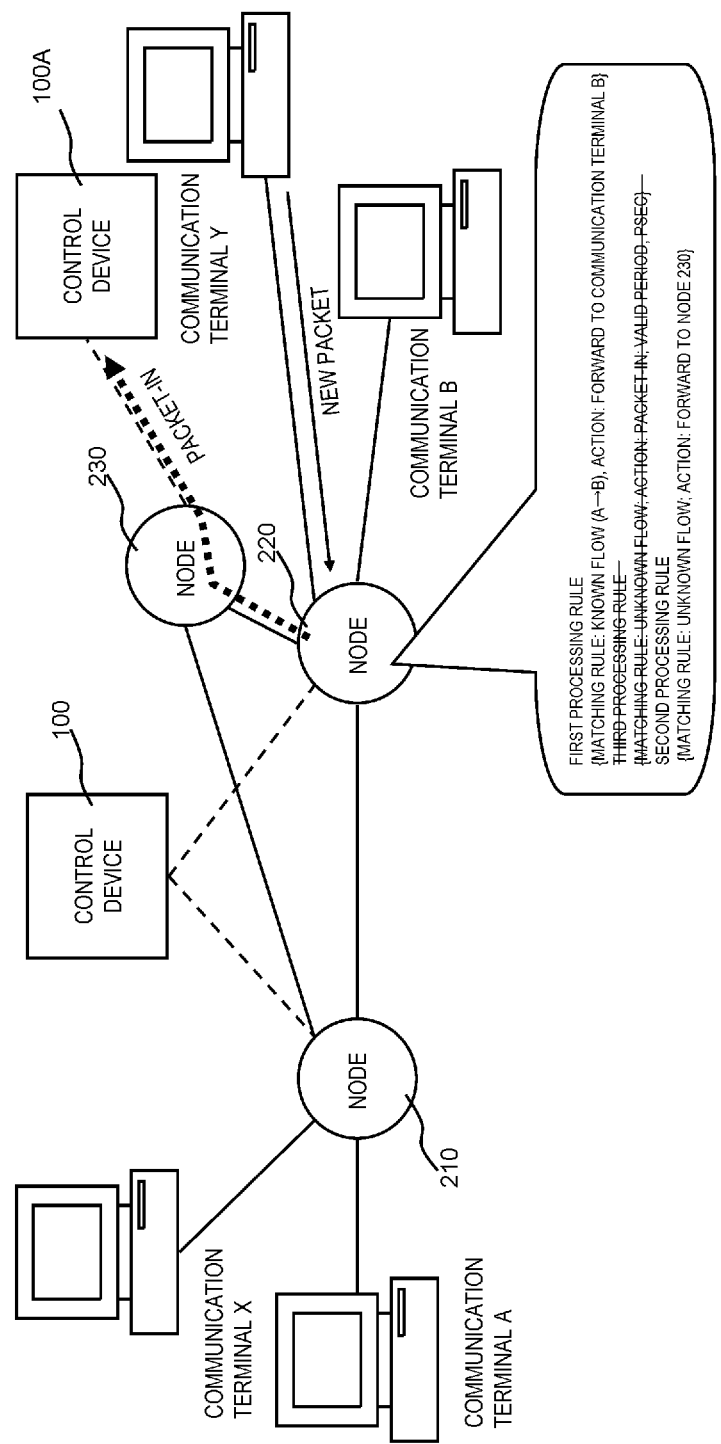

[Fig. 12]
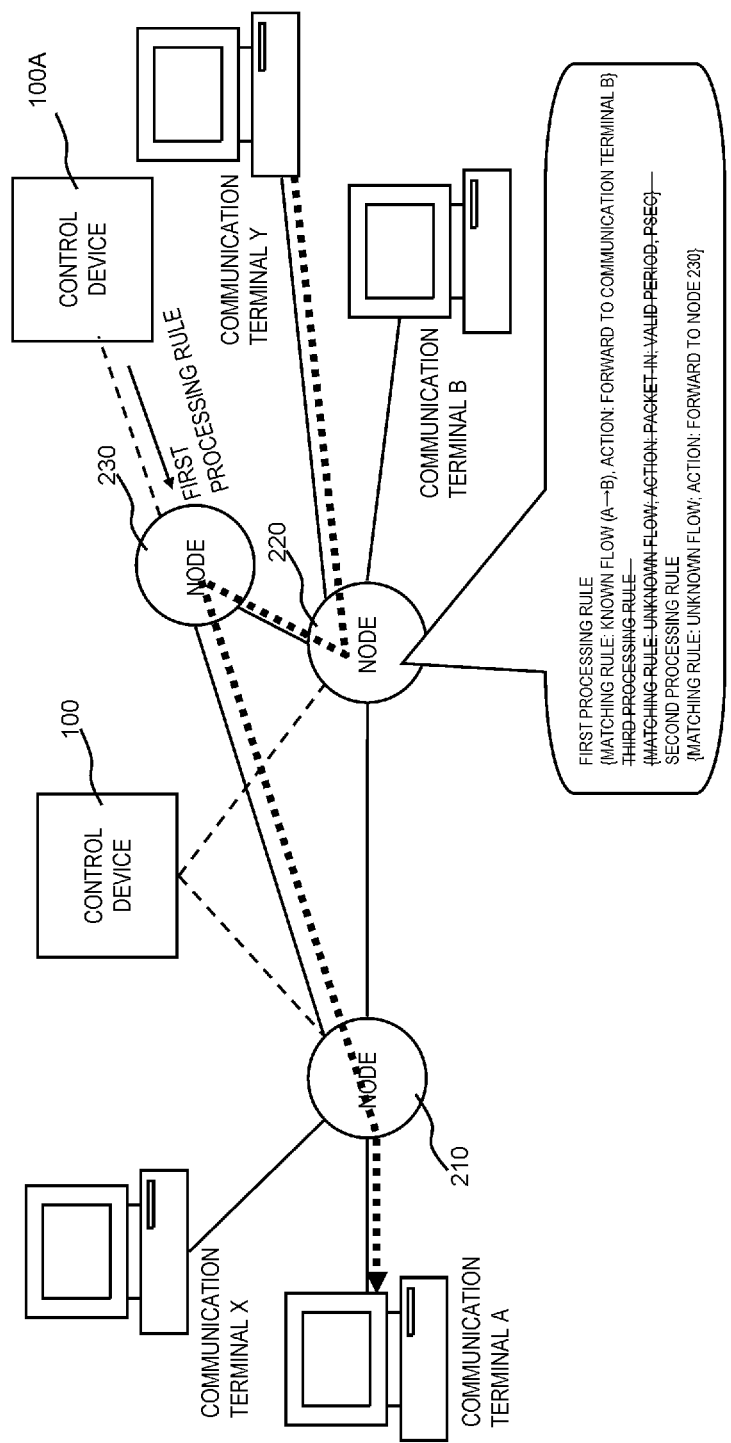

[Fig. 13]
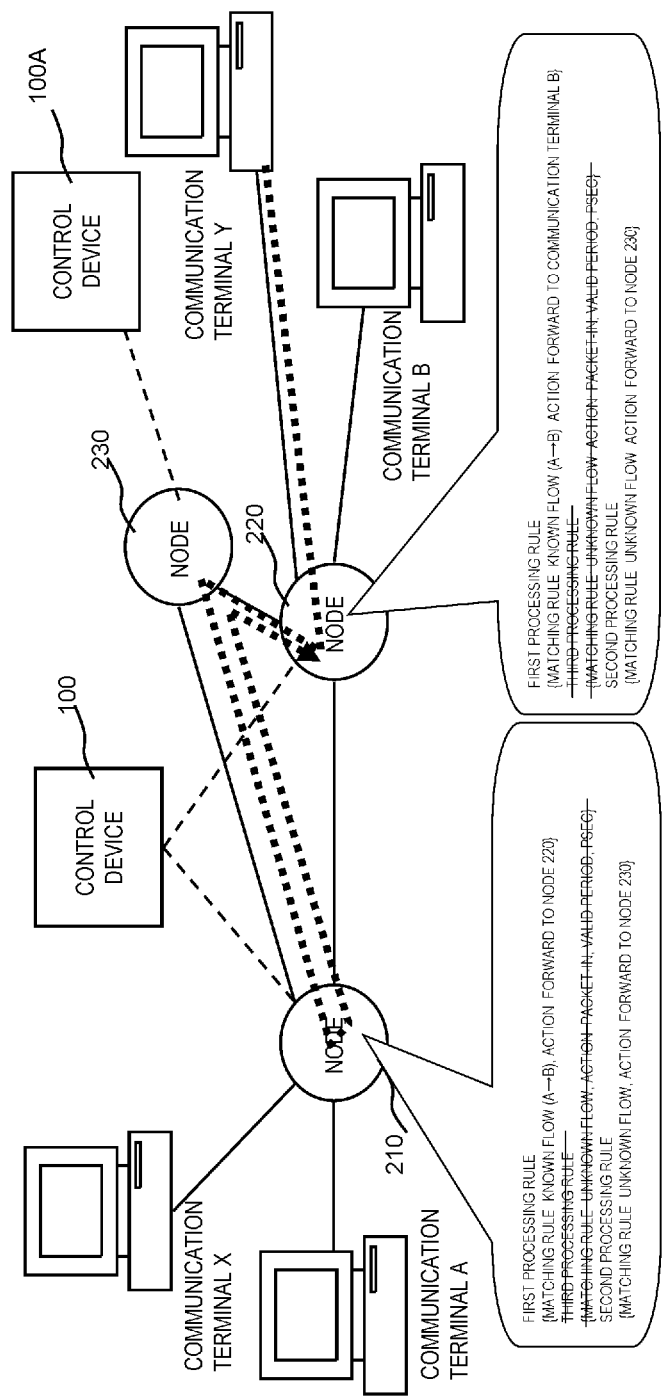

[Fig. 14]
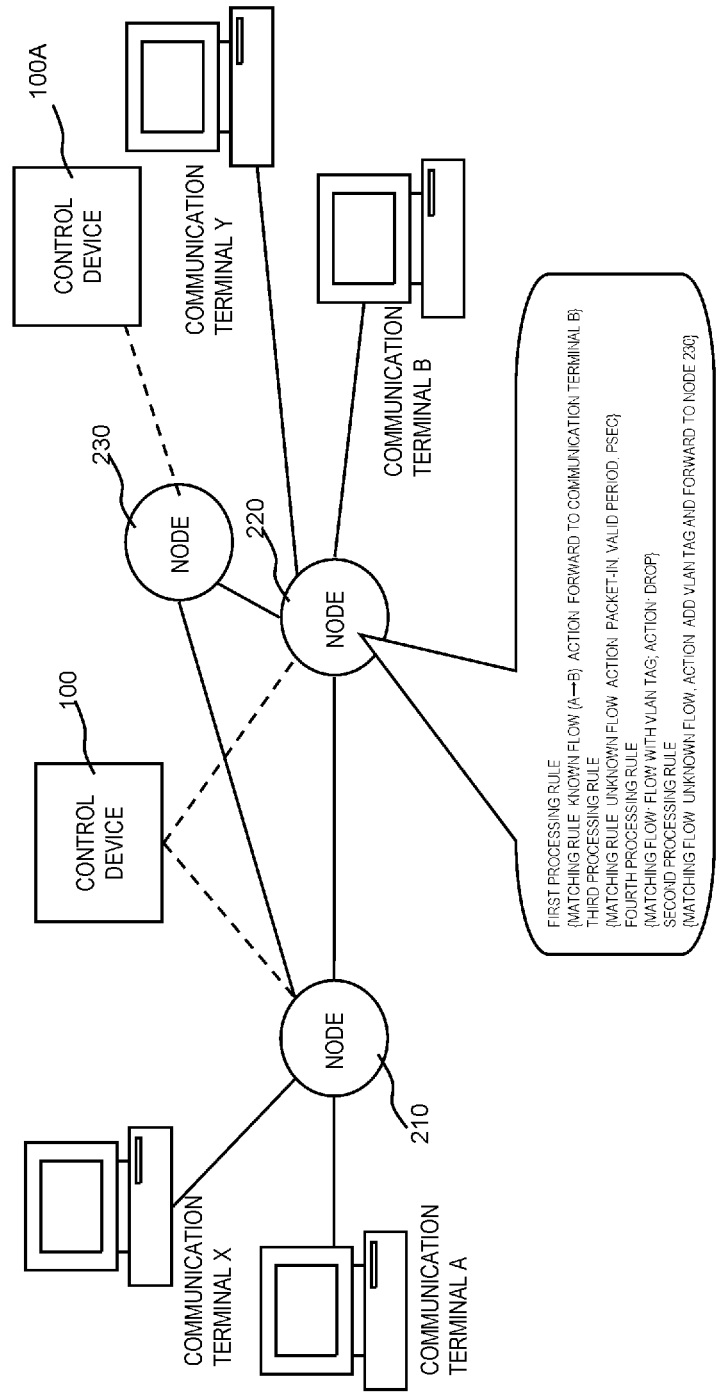

[Fig. 15]
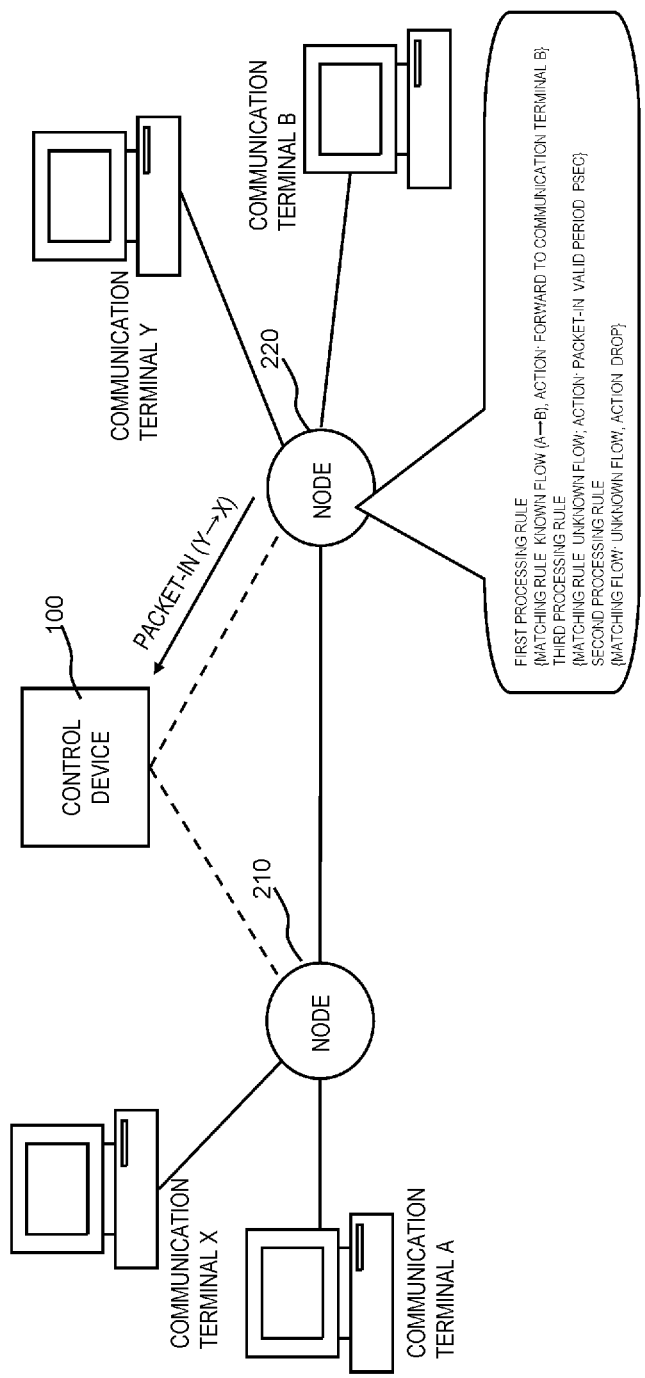

[Fig. 16]
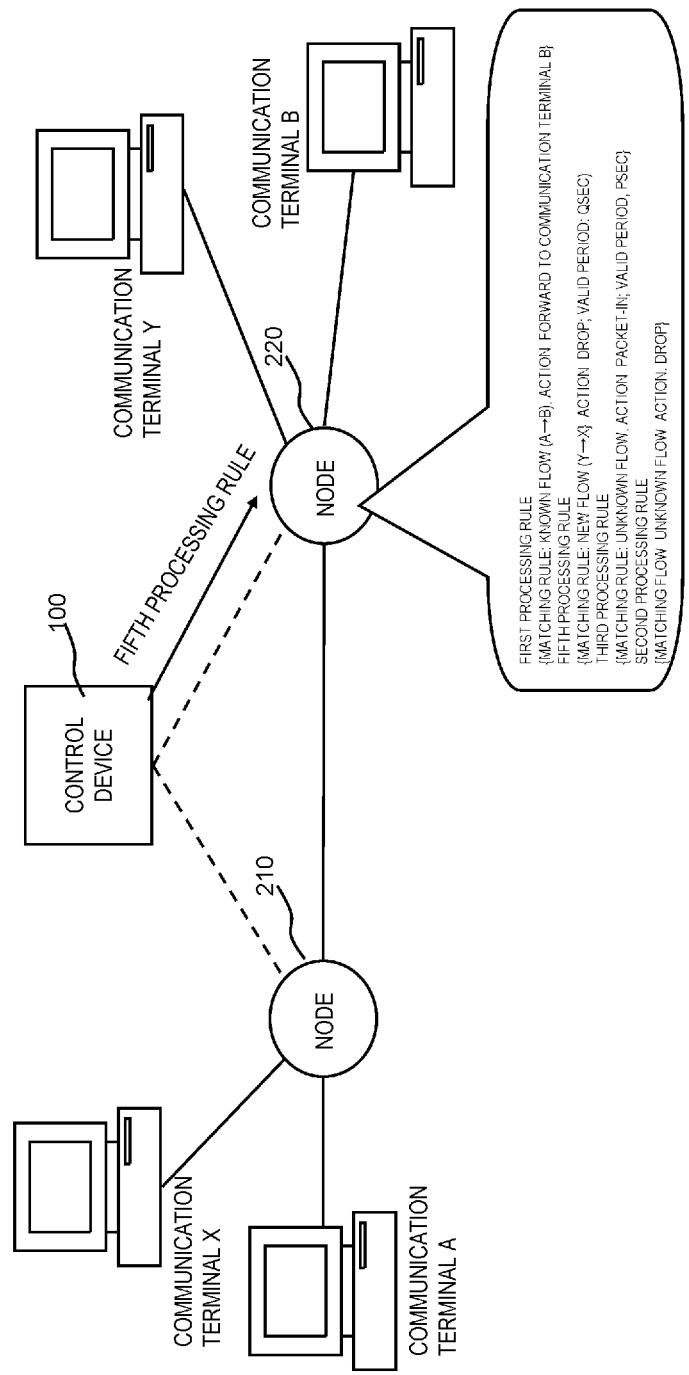

[Fig. 17]
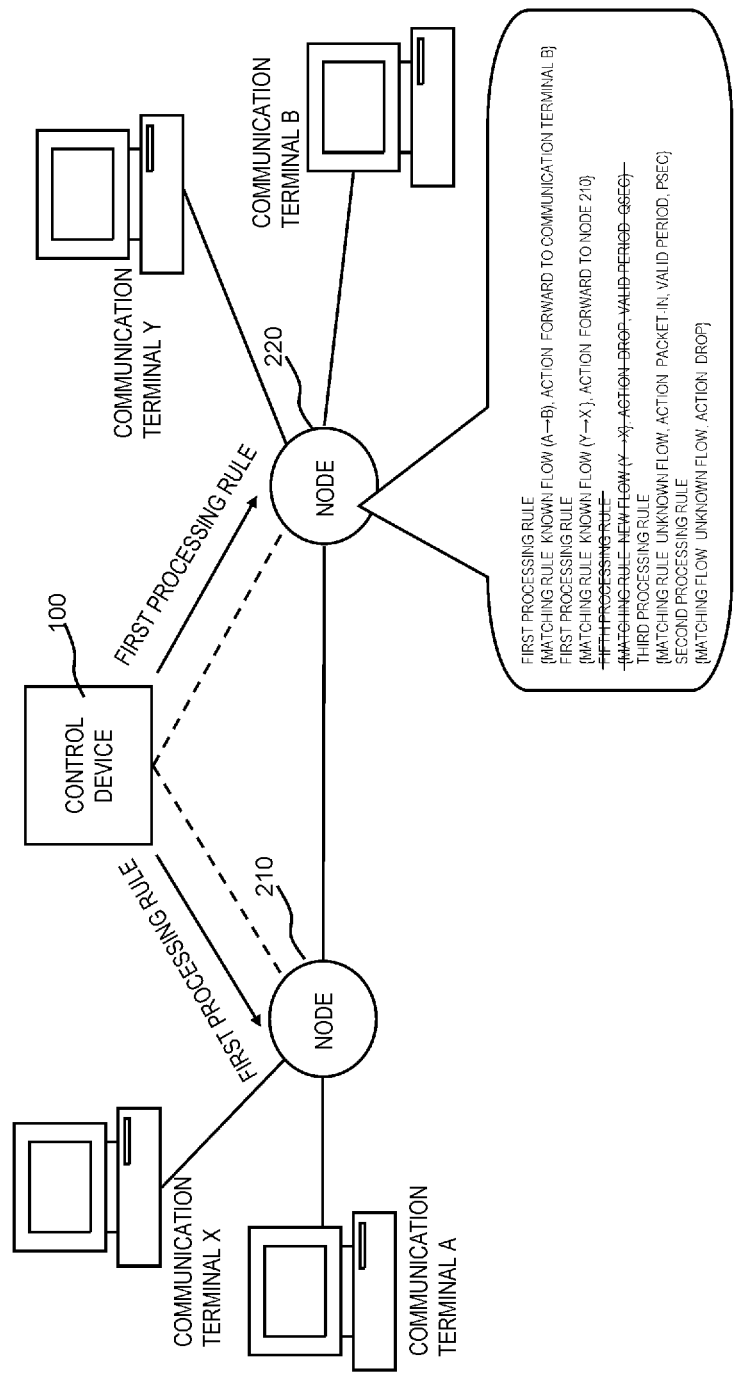

[Fig. 18]
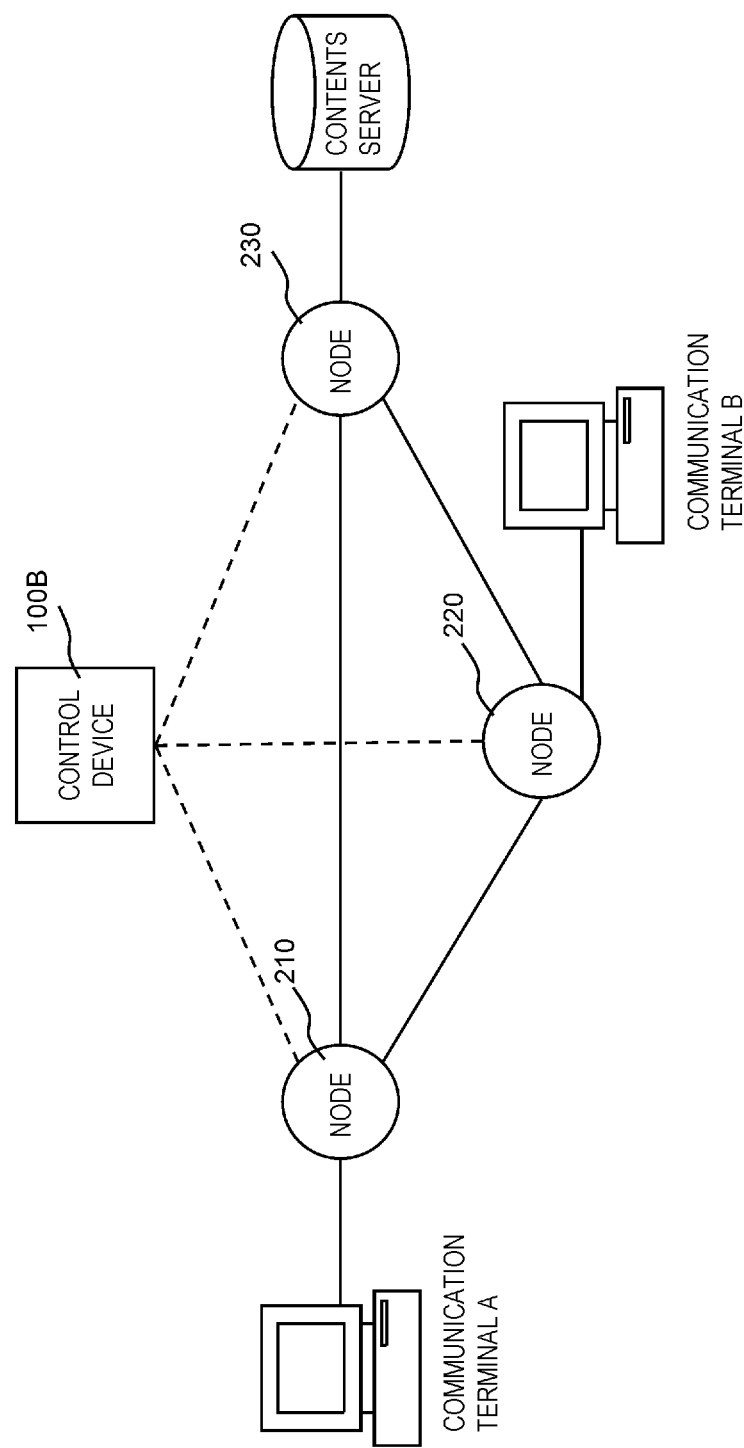

[Fig. 19]
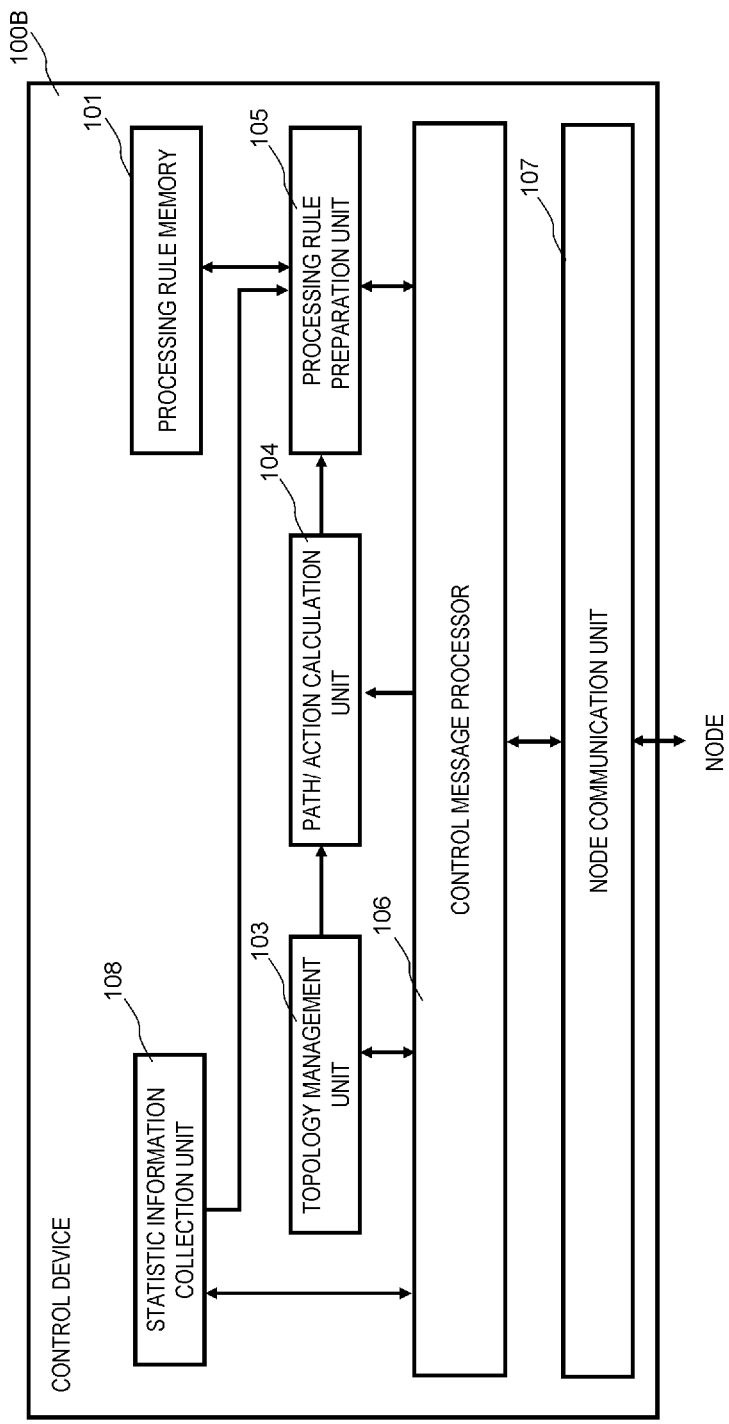

[Fig. 20]
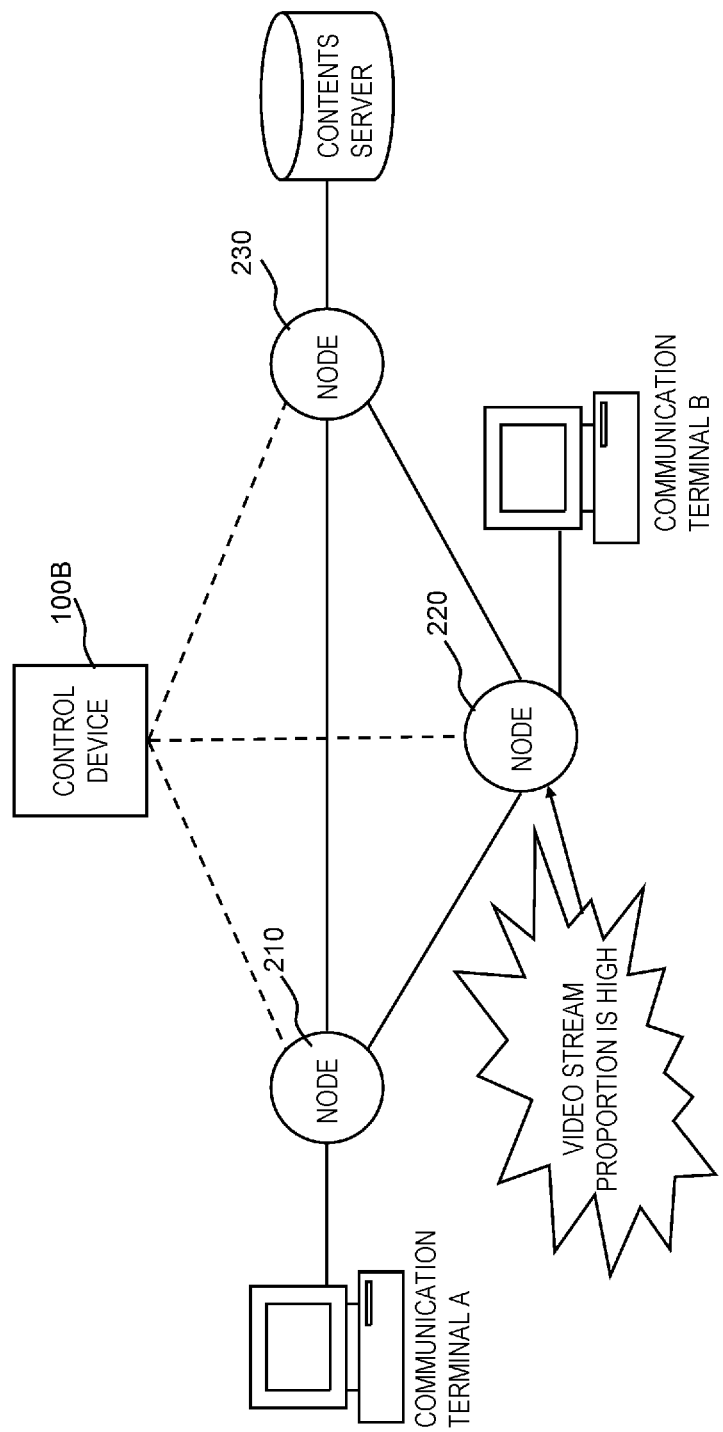

[Fig. 21]

| HEADER FIELDS; MATCHING RULE | | | | | | | | | | | | |
|---|---|---|---|---|---|---|---|---|---|---|---|---|
| INGRESS PORT | ETHER SA | ETHER DA | ETHER TYPE | VLAN ID | VLAN PRIORITY | IP SA | IP DA | IP PROTO COL | IP TOS BITS | TCP/UDP SRC PORT | TCP/UDP DST PORT | COUNTERS | ACTIONS |

COMMUNICATION SYSTEM, CONTROL DEVICE, NODE CONTROLLING METHOD, AND PROGRAM

CROSS-REFERENCE TO RELATED APPLICATIONS

The present Application claims priority rights based upon JP Patent Application No. 2010-275668 filed in Japan on Dec. 10, 2010. The total of the contents disclosed in the Application of the senior filing date is to be incorporated by reference into the present Application. This invention relates to a communication system, a control device, a node controlling method and a program. More particularly, it relates to a communication system which implements communication using a node that processes a received packet in accordance with a processing rule matching to the received packet. It also relates to a control device, a node controlling method and to a program.

BACKGROUND

Technical Field

Recently, a technique termed Open-Flow has been proposed (see Patent Literature 1 and Non Patent Literatures 1 and 2). The OpenFlow comprehends communication as an end-to-end flow and effects path control, recovery from malfunctions, load distribution and optimization on the flow-by-flow basis. The OpenFlow switch, whose design statements are shown in Non Patent Literature 2, includes a secure channel for communication with an OpenFlow controller that is to operate as control device. The OpenFlow switch is in operation in accordance with a flow table the addition in or the rewriting of which is commanded from time to time by the OpenFlow controller. In the flow table, a set of a matching rule (header field) for matching against a packet header, flow statistics information (Counters) and an action defining contents of processing, is defined on the flow-by-flow basis (see FIG. 21).

On receipt of a packet, the OpenFlow switch retrieves the flow table for an entry having the matching rule that matches to the packet's header information (see the header field of FIG. 21). If, as a result of the retrieval, the entry that matches to the incoming packet has been found, the OpenFlow switch updates the flow statistics information (Counters). The OpenFlow switch also applies to the incoming packet the contents of processing stated in an action field of the entry, such as transmission of the packet via the specified port, flooding or discarding (drop). If, as a result of the above mentioned retrieval, no entry matching to the incoming packet has been found, the OpenFlow switch forwards the incoming packet to the OpenFlow controller, over the secure channel, with a request to the controller to decide on a path for the packet based upon the source as well as the destination of transmission of the incoming packet. The OpenFlow switch then receives an implementing flow entry to update the flow table. In this manner, the OpenFlow switch forwards the packet, using the entry stored in the flow table as the set of processing rules.

Patent Literature 1

International Patent Literature WO2008/095010A1

Non Patent Literature 1

Nick McKeown et al., "OpenFlow: Enabling Innovation in Campus Networks", [online], [retrieved on Oct. 6, 2010], Internet <URL: http://www.openflowswitch.org//documents/openflow-wp-latest.pdf>

Non Patent Literature 2

"OpenFlow Switch Specification" Version 1.0.0. (Wire Protocol 0x01) [retrieved on Oct. 6, 2010], Internet <URL: http://www.openflowswitch.org/documents/openflow-spec-v1.0.0.pdf>

SUMMARY

Technical Problem

The following analysis is given by the present invention. The above OpenFlow has an advantage that the OpenFlow switch may be of a simplified configuration. However, it also suffers a problem that, if once a heavy load is imposed on the OpenFlow controller, referred to below as a 'control device', the high load state is sustained. For example, it is supposed that the control device has fallen into a high-load state such that delay has been caused in path calculations or in setting the flow entries, referred to below as 'processing rules', as requested by the OpenFlow switch, referred to below as a 'node'. If the node that has made such request should receive a succeeding packet of the same flow, it requests the control device to prepare a processing rule. This further raises the load imposed on the control device, as a result of which the forwarding performance of the entire communication system is deteriorated. A similar phenomenon may arise in case requests for the control device to set the processing rules are congested within a shorter time interval. It is felt that such phenomenon may arise frequently especially in case of forwarding of video streams.

In view of the above depicted status of the art, it is an object of the present invention to provide a communication system in which the tendency to sustention of the high load state of the control device may be relaxed. It is also intended by the present invention to provide a control device, a node controlling method and a program.

In one aspect, there is provided a communication (network) system comprising a plurality of (network) nodes and a control device. Each of the nodes references, on receipt of a packet, a table including a plurality of processing rules (or handling rules) concerning packet processing. Each of the nodes processes (handles) the packet received in accordance with at least one of the processing rules corresponding to the packet received. Each of the nodes transmits a processing rule setting request (inquiry) in case the corresponding processing rule is not known. The control device sets a packet processing rule in at least one of the nodes on receipt of said processing rule setting request (inquiry). A request staying (suspending) unit that transiently stays (suspending) the setting request (inquiry) to the control device is provided in at least one of the nodes. In an alternative mode of the first aspect, there is provided a network system, comprising: a plurality of network nodes to refer to a table including a plurality of packet handling rules, and to handle an incoming packet with at least one of the packet handling rules, the one or more rules corresponding to the incoming packet; and a control device to set a new packet handling rule to at least one of the network nodes when the control device receives an inquiry from a network node which receives a first packet that a corresponding rule is not included in the table, wherein at least one of the network nodes comprises: a unit to suspend the inquiry to the control device.

In a second aspect, there is provided a control device that controls a plurality of nodes, each of which references, on receipt of a packet, a table including a plurality of processing rules (or handling rules) concerning packet processing. Each of the nodes processes (handles) the packet received in accordance with at least one of the processing rules corresponding to the packet received. The control device includes a unit that receives a processing rule setting request transmitted from the node that received a packet the corresponding processing rule for which is not known. The control device also includes a unit that sets, on receipt of the setting request, the processing rule for the packet for at least one of the nodes, and a unit that transmits to at least one of the nodes a command to transiently stay the setting request to the control device.

In a third aspect, there is provided a communication method in which a packet is processed based upon control by a control device that decides a forwarding path for the packet. The method includes referencing, on receipt of the packet, a table including a plurality of processing rules (or handling rules) concerning packet processing. The communication method also includes processing (handling) the packet received in accordance with at least one of the processing rules corresponding to the packet received, and transmitting a processing rule setting request in case the corresponding processing rule is not known. The communication method further includes transiently staying (halting) the setting request to the control device. The present method is bound up with a particular machine, viz., a control device that controls the node by setting the processing rule.

In a fourth aspect, there is provided a communication node in which a packet is processed based upon control by a control device that decides a forwarding path for the packet. The communication node includes a unit that references, on receipt of the packet, a table including a plurality of processing rules (or handling rules) concerning packet processing, for processing (handling) the packet received in accordance with at least one of the processing rules corresponding to the packet received, and transmits a processing rule setting request to the control device in case the corresponding processing rule is not known. The communication node further includes a unit that receives the setting of the processing rule for the setting request from the control device, and a unit that transiently staying the setting request to the control device.

In a fifth aspect, there is provided a program that allows a control device, controlling a plurality of nodes, to reference a table, on receipt of a packet, and to process the received packet in accordance with at least one of the processing rules (or handling rules) corresponding to the packet received. The table includes a plurality of processing rules concerning packet processing (handling). The program allows the control device to execute the processing of receiving the processing rule setting request transmitted from the node that received a packet the corresponding processing rule for which is not known. The program also allows the control device to execute the processing of setting a packet processing rule in at least one of the nodes in case of receiving the setting request, and the processing of transmitting to at least one of the nodes a command to transiently stay the setting request to the control device. The program may be recorded on a computer-readable recording medium. Viz., the present invention may be implemented as a computer program product.

The meritorious effects of the present invention are summarized as follows. According to the present invention, it is possible to moderate the tendency that a control device, setting a processing (handling) rule in response to a request from the node, might be kept in a high load state.

BRIEF DESCRIPTION OF DRAWINGS

FIG. 1 is a schematic view for illustrating schemata of the present invention.

FIG. 2 is another schematic view for illustrating schemata of the present invention.

FIG. 3 is a further schematic view for illustrating schemata of the present invention.

FIG. 4 is a further schematic view for illustrating schemata of the present invention.

FIG. 5 is a schematic view showing the configuration of a communication system of an exemplary embodiment 1 of the present invention.

FIG. 6 is a block diagram showing the configuration of a control device of the exemplary embodiment 1 of the present invention.

FIG. 7 is a block diagram showing the configuration of a node according to the exemplary embodiment 1 of the present invention.

FIG. 8 is a schematic view for illustrating the operation of the communication system of an exemplary embodiment 1 of the present invention.

FIG. 9 is a schematic view continuing from FIG. 8.

FIG. 10 is a schematic view continuing from FIG. 9.

FIG. 11 is a schematic view for illustrating other processing rules set in the control device of the exemplary embodiment 1 of the present invention.

FIG. 12 is a schematic view continuing from FIG. 11.

FIG. 13 is a schematic view for illustrating the state in which a loop is formed as a result of setting the processing rules of FIG. 12.

FIG. 14 is a schematic view for illustrating the operation of a communication system according to an exemplary embodiment 2 of the present invention.

FIG. 15 is a schematic view for illustrating the operation of a communication system according to an exemplary embodiment 3 of the present invention.

FIG. 16 is a schematic view continuing from FIG. 15.

FIG. 17 is a schematic view continuing from FIG. 16.

FIG. 18 is a schematic view showing the configuration of a communication system of an exemplary embodiment 4 of the present invention.

FIG. 19 is a block diagram showing the configuration of a control device according to the exemplary embodiment 4 of the present invention.

FIG. 20 is a schematic view for illustrating the operation of the communication system according to the exemplary embodiment 4 of the present invention.

FIG. 21 is a block diagram showing the configuration of a flow entry shown in Non Patent Literature 2.

PREFERRED MODES

The outline of the present invention will be first discussed with reference to FIGS. 1 to 4. It is noted that the reference numerals for relevant elements used in the drawings are only for facility in understanding and are not intended to restrict the invention to the mode shown in the drawings. The same applies for figures other than FIGS. 1 to 4 as well. The various figures are given only by way of illustration, such that, for example, the number of nodes or the like components is not intended to restrict the present invention to the particular numbers.

FIG. 1 shows the outline of the communication system (or network system) of the present invention. The communication system includes network nodes (termed generally "nodes" hereinafter) 210, 220 that store (hold) processing (handling) rules to process (handle) incoming packets belonging to a preset flow and a control device 100 that sets the processing rules in response to requests (inquires) from these nodes 210, 220. The nodes 210, 220 process the incoming packet that has matched to the processing rules. It is noted that the processing rules correspond to the flow entries in the OpenFlow system.

Each of the nodes 210, 220 includes a table that stores the processing rules. Although FIG. 1 shows a table owned by the node 210, the node 220 also has a similar table. The node 210 receives, from a communication terminal A, a packet whose destination is a communication terminal B. The node 210 compares a header part of the packet received to the matching rule contained in the processing rule. In case there is the processing rule having a matching rule that matches to the header part, the node 210 processes the packet in accordance with the processing rule. In case there is no matching rule that matches to the header part, the node 210 transmits a processing rule request to the control device 100. In short, in case of receipt of a packet, the corresponding processing rule for which has not been known, the node 210 sends a request to set the processing rule for the unknown packet to the control device 100.

The control device 100 decides the forwarding path for the packet, having the terminal B as the destination, in response to the setting request. The control device 100 sets in the node 210 the processing rule including an action(s) for the forwarding path as decided. It is noted that the control device 100 similarly sets a processing rule, including an action(s), for the packet having the terminal B as destination, in the node 220, in a manner not shown.

Referring to FIG. 2, the operation of the node 210 comparing an incoming packet to a table is specifically explained. The table stores a set of processing rules each of which includes a matching rule and an action. The node 210 processes a received packet in accordance with the processing rule corresponding to the received packet. The node 210 compares the contents of the header of the received packet to the matching rule of each processing rule, as an example. If there is the processing rule including the matching rule corresponding to the header, the node 210 processes the packet in accordance with the processing rule. The table defines priorities as prescribed for the processing rules. The priorities are determined, for instance, by the arraying rows of the processing rules in the table. For example, the smaller the value of the row number of the row in which a processing rule of interest is arrayed, the higher is the priority accorded to the processing rule. In case there is a plurality of the processing rules matched to the incoming packet, the node 210 processes the packet in accordance with the processing rule of the higher priority.

Referring to FIG. 3, the node 210 includes a processing rule memory 212 and a request staying unit 2101, as does the node 220. In case there is no processing rule that matches to the incoming packet in the table stored in the processing rule memory 212, the node 210 transmits to the control device 100 a processing rule setting request for the incoming packet. The request staying unit 2101 has the function to suspend, viz., transiently stay, the transmission of the setting request to the control device 100, even in case there is no processing rule for the incoming packet. By this function, excessive congestion of the processing rule setting requests may be forestalled in the control device 100 to prevent the load on the controlling device 100 from increasing.

The request staying unit 2101 may stay a processing rule setting request at an arbitrary timing. Or, the request staying unit may stay the processing rule setting request at a preset cycle (interval), or in response to prevailing load states of the control device 100. For example, the request staying unit 2101 may periodically exchange messages with the control device, in which case the request staying unit decides that the load on the control device 100 is increased if a message from the control device 100 is delayed by more than a preset threshold value. Based on this decision, the request staying unit stays the processing rule setting request.

FIG. 4 shows an alternative illustrative configuration of the node 210. In this illustrative configuration, the request staying unit 2101 stays transmission of the setting requests to the control device 100 based upon the processing rules as set on the table. In the processing rule memory 212, there are stored a first processing rule that provides for contents of processing for the packet that matches to the matching rule, and a second processing rule. The second processing rule provides that, on receipt of an unknown packet not matched to any of the pre-existing matching rules, the request for setting the corresponding processing rule to the control device 100 is to be suspended. It is noted that the priority of the second processing rule in the table is set at a lower value. The packet is configured to be matched to the second processing rule in case the incoming packet is matched to none of the first processing rules, viz., in case the incoming packet is an unknown packet.

In FIG. 4, the matching rule of the second processing rule is "ANY". Viz., the incoming packet matches to the second processing rule irrespectively of the header contents of the incoming packet. The request staying unit 2101 processes the packet in accordance with the second processing rule. Hence, the transmission of the setting request from the node 210 to the control device 100 is stayed.

The request staying unit 2101 manages control so that, for example, when the load on the control device 100 is high, the nodes 210, 220 will not request the control device to set the processing rules. Specifically, the control device 100 may be provided with a load monitoring unit, and the second processing rule, providing that the setting requests for the processing rules should be suppressed when the load tends to be increased, such as when the load exceeds a preset threshold value, may be set. Or, the node 210 may check the load applied to the control device 100.

The second processing rule provides for packet processing that is carried out without dependency upon control managed by the control device 100. The request staying unit 2101 executes packet processing not dependent upon the forwarding path decided by the control device 100, such as packet discarding.

The packet processing that is carried out without dependency upon control managed by the control device 100 may be exemplified by packet processing decided by the routing information exchanged in accordance with the routing protocol among different nodes. By this second processing rule, the node 210 is able to autonomously forward incoming packets without recourse to the control device 100.

The second processing rule may be set in the total of the nodes 210, 220, as shown in FIG. 4. It is however possible to select nodes where the second processing rule is to be set. For example, such a node that might be more effective in suppressing the processing rule setting request may be selected in consideration of load states of the control device, the number of hosts (communication terminals) connected thereto or the statistic information of the data traffic of each host. It is also possible for the control device 100 to analyze the contents of the packets, the processing rule setting requests for which have been made from the nodes, such as IP headers or TCP headers. By so doing, it is possible to select such nodes that will be more effective in suppressing processing rule setting requests.

Exemplary Embodiment 1

An exemplary embodiment 1 of the present invention will now be explained with reference to the drawings. FIG. 5 depicts the configuration of the exemplary embodiment 1 of the present invention. Referring to FIG. 5, the configuration includes a node 210, communication terminals A and X are connected to, another node 220, communication terminals B, Y are connected to, and a control device 100. The control device controls these nodes 210, 220 over a dedicated channel, indicated by broken lines, for example, a secure channel in the OpenFlow system.

The control device 100 decides on a packet forwarding path on the packet flow basis. The control device 100 sets in nodes lying on a packet forwarding path, out of the nodes 201, 202, the processing rules for implementing packet forwarding along the packet forwarding path. In the following explanation of the exemplary embodiment, it is assumed that the control device 100 is an OpenFlow controller of Non Patent Literature 2 capable of setting processing rules (flow entries) in the nodes 210, 220, transmitting a buffered packet or collecting the statistic information (Counters). It is noted that the control device 100 of the present invention is not limited to the OpenFlow controller. Viz., the control device need not be a device configured in accordance with the OpenFlow protocol, provided that the control device is able to perform centralized management of packet forwarding by nodes exemplified by switches. The same applies for exemplary embodiments other than the present exemplary embodiment. It is noted that, in the figures referred to in the following explanation, the tables in which the processing rules are set are simplified as compared to FIGS. 1 to 4. In these simplified tables, the upper the position of the row in which each processing rule is entered, the higher is the priority of the processing rule in question. The same applies for exemplary embodiments other than the present exemplary embodiment.

FIG. 6 depicts a block diagram showing the configuration of a control device (controller) 100 operating as OpenFlow controller. Referring to FIG. 6, the control device (controller) 100 includes a processing rule memory 101 in which there are stored the processing rules (flow entries) each made up of a matching rule, shown by way of example in FIG. 21, the flow statistic information (Counters), and an action(s), inclusive of a timer value and the priority information. The controller 100 also includes a topology management unit 103, a path/action calculation unit 104, a processing rule preparation unit 105, a control message processor 106 and a node communication unit 107 configured for doing communication with the nodes 210 to 240. The operation of these components is the following.

The topology management unit 103 constructs and manages the network topological information, based upon the relationship of interconnection of the nodes 210, 220 as collected by the node communication unit 107.

The path/action calculation unit 104 calculates the packet forwarding path and the actions based upon the network topological information as constructed by the topology management unit 103. The actions are executed by the nodes on the packet forwarding path and include priorities and timer values as valid period of the processing rules.

The processing rule preparation unit 105 prepares the matching rule to identify the packet belonging to a flow in question in response to a request from the node 210 or 220. The processing rule preparation unit puts the so prepared matching rule and the action calculated by the path/action calculation unit 104 together to form a processing rule (flow entry) which is set in each of the nodes 210, 220. The processing rule preparation unit 105 also registers the so formed processing rule (flow entry) in the flow table of the processing rule memory 101 in order to allow for referencing at the time of a request from the node 210 or 220 to set the processing rule (flow entry) a second time.

The processing rule preparation unit 105 of the controller 100 of the present exemplary embodiment also forms (and sets) a set of another processing rule (third processing rule) having a valid period and a further processing rule (second processing rule) on receipt of an unknown packet not belonging to any existing flows irrespectively of a request from the node 210 or 220. The third processing rule provides for contents of processing of having the nodes 210, 220 request the control device 100 to set a new processing rule. The second processing rule is lower in priority than the third processing rule but does not have the valid period and allows discarding the unknown packet not belonging to any existing flows on receipt of such unknown packet. The processing rule preparation unit 105 also updates the processing rule having the valid period (third processing rule) at a preset time interval to forestall expiration of the processing rule having the valid period (third processing rule). It is also possible for each of the nodes 210, 220 to set for itself the second and third processing rules in a flow table owned by each of the nodes 210, 220.

The control message processor 106 analyzes a control message, received from the node 210 or 220, to deliver the control message information to relevant processing unit within the control device (controller) 100. For example, on receipt from the node 210 or 220 of a message requesting a setting of the processing rule (Packet-In), the control message processor 106 checks to see whether or not the set of processing rules (flow entries) relevant to such flow has been registered in the processing rule memory 101. If the set of processing rules has not been registered, the control message processor asks the path/action calculation unit 104 to prepare a new set of processing rules (flow entries).

A computer program that allows the respective components (processing unit) of the control device (controller) 100, shown in FIG. 6, to execute the above mentioned processing operations with the aid of the hardware of a computer composing the controller 100, may also be used.

FIG. 7 depicts a block diagram showing the configuration of a node 210 operating as OpenFlow switch. Referring to FIG. 7, the node 210 includes a processing rule memory 212 that stores the processing rule(s), as set by the controller, and a packet processor 211. The packet processor 211 retrieves the processing rule(s) matched to the incoming packet from the processing rule memory 212 to process the incoming packet. The above applies for the node 220 as well. For the node 210 (220), the OpenFlow switch, shown in Non Patent Literature 2, may be used, the entire disclosure where of is incorporated herein by reference thereto.

The valid period may be set for the processing rules stored in the processing rule memory 212. The nodes 210, 220 are configured to delete the processing rule(s), whose valid period has lapsed, from the processing rule memory 212.

Further, it is possible to set priorities for the processing rules stored in the processing rule memory 212. The nodes 210, 220 execute contents of processing provided for in the processing rule of higher priority among the processing rules matched to the incoming packets. Examples of the priorities that may be used include those that are able to be set in the action field (Priority) of the processing rules of Non Patent Literature 2 (see Non Patent Literature 2, page 27, '5.3.3 Modify State Messages'). Such a method may also be used in which the processing rules are stored in the processing rule memory 212 in the order of the falling priorities and in which retrieval is commenced from the processing rule of higher priority to select a first matching processing rule.

The operation of the present exemplary embodiment will now be described in detail with reference to FIGS. 8 to 12. It is assumed that, in connection with a pre-known flow (communication from a communication terminal A to a communication terminal B), a forwarding path for forwarding a packet from the node 210 to the node 220 has been calculated and that the corresponding first processing rule has been set in each of the nodes 210, 220, as shown in FIG. 8.

It is noted that an N'th processing rule {matching rule: XXX; action: YYY} in the drawing denotes that, when a packet that has matched to the matching rule 'XXX' is received, the processing 'YYY' is to be carried out. On the other hand, a 'pre-known flow' in the drawing denotes a flow a processing rule for which is included in the flow table. For example, on receipt of a packet belonging to a pre-known flow from the communication terminal A to the communication terminal B, for example, a packet whose header includes the information that the destination is the communication terminal B, the node 210 of FIG. 8 may transmit the packet via its port the node 220 is connected to. In similar manner, on receipt of a packet belonging to the pre-known flow addressed from the communication terminal A to the communication terminal B, the node 220 performs contents of processing of transmitting the packet via its port the communication terminal B is connected to. By so doing, the packet, transmitted from the communication terminal A, may be delivered to the communication terminal B.

The control device 100 sets second and third processing rules in the nodes 210, 220, at the time of setting the above mentioned first processing rule or based upon e.g., the statistics information as collected from the nodes 210, 220. The valid period of the third processing rule is P seconds. It is noted that the contents of the second processing rule are such that, if a packet received is one belonging to an unknown flow, viz., a flow matched to none of the pre-existing processing rules (first processing rules) as held (stored) by the nodes, such packet is to be discarded. This, however, is only by way of illustration, such that it is not mandatory that the action of the second processing rule is to be packet discarding. On the other hand, there is no valid period set to the second processing rule, such that, if P seconds have elapsed as from the time point of setting the second processing rule, the second processing rule is not deleted by the nodes 210, 220. It is however possible to set a valid period longer than that of the third processing rule of P seconds as the valid period for the second processing rule.

The contents of the third processing rule are such that, if a packet received is one belonging to an unknown flow, viz., the packet received is matched to none of the pre-existing processing rules (first processing rules) as held by the node, a processing rule setting request message (Packet-In) is to be transmitted to the control device 100. Also, a valid period of P seconds is set for the third processing rule, such that, if P seconds have elapsed as from its setting time point, the third processing rule is to be deleted (dropped) by the nodes 210, 220.

The control device 100 then performs a third processing rule update operation at a preset time interval not longer than P seconds, as shown in FIG. 9. Thus, if, as long as the control device 100 updates the third processing rule within this preset time period, a packet belonging to an unknown flow is detected by the node 210 or 220, the unknown packet matches to the third processing flow. The node 210 or 220 thus transmits a processing rule setting request message (Packet-In) to the control device 100.

For example, if the node 210 has received a packet from the communication terminal X to the communication terminal Y, the node transmits to the control device a processing rule setting request message (Packet-In) for the packet addressed from the communication terminal X to the communication terminal Y. On receipt of the processing rule setting request message (Packet-In), the control device 100 calculates the path of forwarding the packet addressed from the communication terminal X to the communication terminal Y, while setting the processing rule for implementing the forwarding path (first processing rule). This implements the forwarding of the packet from the communication terminal X to the communication terminal Y.

If subsequently the control device 100 is excessively loaded, by some reason or other, thus causing delay in updating the third processing rule, the third processing rule is deleted in the node 210 or 220, as shown in FIG. 10. Since the third processing rule has been deleted, the packet belonging to the unknown flow matches to the second processing rule. Hence, even if the node 210 or 220 detects a packet belonging to the unknown flow, the node 210 or 220 does not transmit the processing rule setting request message (Packet-In) to the control device 100, but discards the received packet in accordance with the second processing rule.

Hence, if the control device 100 is under a high load, processing rule setting request messages (Packet-In) are suppressed. When the load has subsequently been lowered, the control device 100 sets the third processing rule in each of the nodes 210, 220, thereby restoring the state to that shown in FIG. 9.

Viz., with the present exemplary embodiment, it becomes possible to suppress the processing rule setting requests from the nodes 210, 220 in case of excessive loading of the control device 100.

In the foregoing explanation, it is assumed that the processing rule setting request messages (Packet-In) are to be issued for all unknown flows. It is however also possible to have certain specified data traffics discarded as a principle or not discarded provided that certain conditions are set in the matching rule of each of the second and third processing rules.

In addition, it has been explained in the foregoing that the second processing rule provides for contents of processing defining that the packet in question is to be discarded. It is however possible to use the second processing rule providing for packet queuing or packet forwarding to other nodes.

For example, the second processing rule may be so set that the packet received is to be forwarded to a node 230 controlled by a control device 100A distinct from the control device 100, as shown in FIG. 11. If the load on the control device 100 is increased, the node 220, which has received a new packet from the communication terminal Y, forwards the received packet to the node 230 in accordance with the second processing rule, as indicated by a thick broken line in FIG. 11. The node 230, which received the packet, sends a processing rule setting request message (Packet-In) not to the control device 100 but to the control device 100A, as indicated by a thick broken line in FIG. 11. The load on the control device 100 may thus be relieved.

The control device 100A then sets a processing rule to process the packet sent from the communication terminal Y (first processing rule), in the node 230, as shown in FIG. 12. A packet addressed from the communication terminal Y to the processing terminal A may thus be forwarded on a forwarding path via nodes 220, 230 and 210, as indicated by a broken line in FIG. 12.

Exemplary Embodiment 2

An exemplary embodiment 2 of the present invention will now be explained with reference to the drawings. The second processing rule, providing for an action of forwarding a received packet to the node 230, controlled by the control device different from the control device for the node 220, may be set, as explained with reference to FIGS. 11 and 12. However, if the second processing rule similar to that set in the node 220 is set in the node 210, as shown in FIG. 13, the received packet might possibly be returned from the node 210 to the node 230. The exemplary embodiment 2 of the present invention provides for a configuration in which it is possible to suppress such packet looping from occurring. Since the present exemplary embodiment 2 may be implemented by a configuration equivalent to that of the exemplary embodiment 1, described above, the following explanation will be centered on the points of difference from the exemplary embodiment 1.

FIG. 14 illustrates the operation of a communication system according to the exemplary embodiment 2 of the present invention. The present exemplary embodiment differs from the exemplary embodiment 1 in that, in the present exemplary embodiment 2, the processing of rewriting a vlan tag (VLAN ID) before forwarding the packet to the next hop is added to a second processing rule, and a fourth processing rule to discard a packet whose vlan tag (VLAN ID) has been rewritten is set. Otherwise, the first and third processing rules may be the same as those in the exemplary embodiment 1.

By so doing, the packet returned from the node 230, the packet was once forwarded to, may positively be discarded at the node 220, as shown in FIG. 13. It is of course possible to set the fourth processing rule providing for queuing the packets or forwarding them to other nodes, instead of discarding the packets, as explained in the above mentioned exemplary embodiment 1.

In the foregoing, it has been explained that a packet that has looped back is discriminated by rewriting a packet's vlan tag (VLAN ID) before forwarding the packet to the next hop. However, the information indicating that the packet is that forwarded by the own node may be written in an any field not used in the so rewritten packet, such as MAC address (source or destination of transmission), EtherType or an IP address (source or destination of transmission).

Exemplary Embodiment 3

An exemplary embodiment 3 of the present invention, in which a control device is to execute a further operation, will be explained with reference to the drawings. Since the present exemplary embodiment 3 may be implemented by a configuration equivalent to that of the exemplary embodiment 1, described above, the following explanation will be centered on the points of difference from the exemplary embodiment 1.

On detecting a flow addressed from the communication terminal Y to the communication terminal X, the node 220 transmits a processing rule setting request message (Packet-In) to the control device 100, in accordance with the third processing rule, as shown in FIG. 15. It is assumed that the flow addressed from the communication terminal Y to the communication terminal X is such a flow that corresponding processing rule setting request messages (Packet-In) would be produced at a high frequency after the incoming of a new packet, for example, moving picture configuration data traffics.

It is supposed that the control device 100 of the present exemplary embodiment has concluded that the flow as the subject of the processing rule setting request message (Packet-In) is such a flow that corresponding processing rule setting request messages (Packet-In) would be produced at a high frequency. In such case, the control device 100 sets a fifth processing rule in the node 220 as the source of transmission of the processing rule setting request message (Packet-In). The fifth processing rule provides that the flow addressed from the communication terminal Y to the communication terminal X is to remain discarded for a preset time period of Q seconds, and is set in the node 220 as the source of transmission of the processing rule setting request message (Packet-In), as shown in FIG. 16.

After setting the fifth processing rule, the control device 100 calculates a packet forwarding path for the flow addressed from the communication terminal Y to the communication terminal X, while setting the first processing rule, as shown in FIG. 17. After the end of the setting of the first processing rule, the packet transmitted from the communication terminal Y is delivered via the nodes 220, 210 to the communication terminal X.

In the present exemplary embodiment, described above, any succeeding packets from the communication terminal Y remain discarded for the preset time period (Q seconds) in the node 220. Thus, should the delay be caused in the control device 100 in connection with the calculations of the packet forwarding path or with the setting of the processing rules, there is no fear of the processing rule setting request messages (Packet-In) occurring at a higher frequency.

In the foregoing, it has been explained that the fifth processing rule is to be set for the flow for which the processing rule setting request messages are likely to be produced at a higher frequency. However, there are cases where it is known from the outset that path calculations by the control device 100 or the setting of the first processing rule would be time-consuming in consideration of the network topology or the number of the nodes. In such case, the fifth processing rule of causing the succeeding packets to be discarded for a preset time may, as a principle, be set.

In the above explanation, the contents for processing of the fifth processing rule are to command for executing packet discarding. As an alternative, the contents for processing of the fifth processing rule may also be for packet queuing or the like.

Exemplary Embodiment 4

An exemplary embodiment 4 of the present invention, in which the configuration of the control device has partially been changed, will now be described with reference to the drawings. The following explanation of the exemplary embodiment 4 will be centered on the points of difference of the exemplary embodiment from the exemplary embodiment 1.

FIG. 18 depicts the configuration of the exemplary embodiment 4 of the present invention. Referring to FIG. 18, the configuration includes a node 210, a communication terminal A is connected to, a node 220, a communication terminal B is connected to, and a node 230, a contents server is connected to. In addition, the configuration includes a control device 100B that controls these nodes 210 to 230 over a secure channel indicated by broken lines.

FIG. 19 depicts a block diagram showing the configuration of a control device 100B of the present exemplary embodiment. The present control device differs from the control device 100 of the exemplary embodiment 1, shown in FIG. 6, in including a statistic information collection unit 108.

The statistic information collection unit 108 is a unit that collects the statistic information, collected from one processing rule to another, from the nodes 210 to 230 via the control message processor 106 and the node communication unit 107.

In the control device 100B of the present exemplary embodiment, provided with the statistic information collection unit 108, such a flow for which it is desired to suppress the processing rule setting request is specified for a node where it is desired to suppress the processing rule setting request, based upon the collected statistic information. The control device 100B thus sets the above mentioned second to fifth processing rules.

It is supposed that, as an example, the proportion of a video stream from the contents server to the communication terminal B is high in the node 220 for a certain time zone, as shown in FIG. 20. In such case, the control device 100B sets a group of the second and third processing rules, or the fifth processing rule, in advance, in the nodes 220 and 230 for the time zone in question.

It is thus possible with the present exemplary embodiment to set in advance the processing rule that might suppress the processing rule setting request, in consideration of temporal or local traffic variations or of constraints in the traffic.

Although the description has been made of preferred exemplary embodiments of the present invention, such exemplary embodiments are given only by way of illustration and are not intended to limit the scope of the present invention. Viz., further modifications, substitutions or adjustments may be made without departing from the basic technical concept of the present invention. For example, the number of the nodes or the communication terminals as well as the network configuration in the above described exemplary embodiments has been simplified to assist in understanding of the present invention, and may be varied to meet practical needs.

Moreover, as explained in the above exemplary embodiments, the particular nodes where the second to fifth processing rules are set may optionally be set from the perspective of efficiently suppressing processing rule setting requests. For example, if there are further nodes between the nodes 210, 220 shown in FIG. 1, and it is desirable to suppress processing rule setting requests from these further nodes, a group of the second and third processing rules may be set for these further nodes. If the nodes provided between the nodes 210, 220 are not connected to the external communication terminals, with the frequency of occurrence of the processing rule setting requests from these non-connected nodes being not that high, there is no necessity to set the group of the second and third processing rules for these interposed nodes.

On the other hand, it has been explained in the above exemplary embodiments that valid period are to be provided for the third and fifth processing rules. These valid period may be of fixed values, or may also be varied depending upon the time zone or on the species of the data traffics. For example, the valid period of the third processing rule may be made shorter the higher the load on the control device. The valid period may also be made longer little by little such as in the case of slow start in TCP (Transmission Control Protocol).

The valid period may also be changed subject to analysis of the contents of the packet as well as the processing rule setting request for which has been received from a node, such as IP header or the TCP header.

Preferred forms of the present invention will now be summarized as follows.

(Mode 1)

A communication system comprising:

a node that holds a first processing rule, providing for contents of processing of a packet belonging to a preset flow, and that processes an incoming packet matching to the processing rule; and a control device that sets a first processing rule in the node in response to a request from the node;

the control device setting a second processing rule in the node; the second processing rule being applied in case of a high load on the control device and providing for contents of processing of suppressing a processing rule setting request at the time of receipt of an unknown packet belonging to none of existing flows.

(Mode 2)

The communication system according to mode 1, wherein, the control device sets, in the node, a third processing rule applied with priority to the second processing rule; the third processing rule providing for contents of processing of having the node request the control device to set the first processing rule on receipt of a packet matched to a preset matching rule.

(Mode 3)

The communication system according to mode 2, wherein, the third processing rule provides for contents of processing of having the node request the control device to set the first processing rule at the time of receiving an unknown packet belonging to none of existing flows, and for the valid period thereof;

the second processing rule being applied in case of delay in an operation of updating the third processing rule by the control device.

(Mode 4)

The communication system according to any one of modes 1 to 3, wherein the contents of processing of the second processing rule are for one out of discarding the received packet, forwarding the received packet to another node and queuing the received packets.

(Mode 5)

The communication system according to any one of modes 1 to 4, wherein, as the contents of processing of the second processing rule, rewriting a header of the received packet and forwarding the header-rewritten packet to another node are set; and wherein, on receipt of the header-rewritten packet from the another node, a fourth processing rule is set; the fourth processing rule providing for one selected from the group consisting of discarding the received packet, forwarding the received packet to another node and queuing the received packets.
(Mode 6)
The communication system according to any one of modes 3 to 5, wherein,
the higher the loading state of the control device, the shorter is the valid period of the third processing rule as set by the control device.
(Mode 7)
The communication system according to any one of modes 1 to 6, wherein,
the control device is connected to a plurality of nodes; and wherein
the higher the loading state of the control device, the greater is the number of the nodes in which the second processing rules are set.
(Mode 8)
The communication system according to any one of modes 1 to 7, wherein,
the control device includes a unit that monitors the load state thereof; and wherein,
the control device sets the second processing rule in the node in response to the load state of the control device.
(Mode 9)
The communication system according to any one of modes 3 to 8, wherein,
the control device changes the valid period of the third processing rule based upon the traffic information as collected from the node.
(Mode 10)
The communication system according to any one of modes 1 to 9, wherein,
the control device is connected to a plurality of nodes; and wherein,
the node where the second processing rule is set or the flow as the subject of the second processing rule is decided based upon the traffic information as collected from the nodes.
(Mode 11)
The communication system according to any one of modes 1 to 10, wherein,
a fifth processing rule is set in the node that requested setting the first processing rule; the fifth processing rule providing for contents of processing of having the node discard or queue succeeding packets of the same flow for a preset time period.
(Mode 12)
A control device connected to a node that holds a first processing rule providing for contents of processing of a packet belonging to a preset flow, and that processes an incoming packet matching to the processing rule; wherein
the control device sets in the node a second processing rule applied in case of a high load on the control device; the second processing rule providing for contents of processing of suppressing a processing rule setting request in case of receiving an unknown packet belonging to none of existing flows.
(Mode 13)
The control device according to mode 12, wherein,
a third processing rule is set in the node; the third processing rule being applied with priority to the second processing rule; the third processing rule providing for contents of processing of having the node request the control device to set the first processing rule on receipt of a packet matching to a preset matching rule.
(Mode 14)
The control device according to mode 13, wherein,
the third processing rule provides for contents of processing of having the node request the control device to set a processing rule at the time of receipt of an unknown packet belonging to none of pre-existing flows; the third processing rule also providing for a preset valid period thereof;
the second processing rule being applied as a result of delay caused in the update operation of the third processing rule by the control device.
(Mode 15)
The control device according to any one of modes 12 to 14, wherein,
the contents of processing of the second processing rule provide for one selected from the group consisting of discarding the received packet, forwarding the received packet to another node and queuing the received packets.
(Mode 16)
The control device according to any one of modes 12 to 15, wherein,
as the contents of processing of the second processing rule, rewriting a header of the received packet and forwarding the header-rewritten packet to another node are set; and wherein,
a fourth processing rule is set; the fourth processing rule providing, on receipt of the header-rewritten packet from the another node, for one out of discarding the received packet, forwarding the received packet to another node and queuing the received packets.
(Mode 17)
The control device according to any one of modes 14 to 16, wherein,
the higher the loading state of the control device, the shorter is the valid period of the third processing rule set by the control device.
(Mode 18)
The control device according to any one of modes 12 to 17, wherein,
the control device is connected to a plurality of nodes; and wherein
the higher the loading state of the control device, the greater is the number of the nodes in which the second processing rules are set.
(Mode 19)
The control device according to any one of modes 12 to 18, wherein,
the control device includes a unit that monitors the load state thereof; and wherein,
the control device sets the second processing rule in the node in response to the load state thereof.
(Mode 20)
The control device according to any one of modes 14 to 19, wherein,
the control device changes the valid period of the third processing rule based upon the traffic information as collected from the node.
(Mode 21)
The control device according to any one of modes 12 to 20, wherein,
the control device is connected to a plurality of nodes; and wherein,
the node where the second processing rule is set or the flow as the subject of the second processing rule is decided based upon the traffic information as collected from the nodes.

(Mode 22)
The control device according to any one of modes 12 to 21, wherein,
a fifth processing rule providing that the node that requested setting the first processing rule is to execute discarding or queuing succeeding packets of the same flow for a preset time period is set.

(Mode 23)
A method for controlling a node by a control device connected thereto; the node staying a first processing rule providing for contents of processing for a packet belonging to a preset flow; the node processing an incoming packet that matches to the processing rule; the method comprising:
setting in the node a first processing rule in response to a request from the node; and
setting a second processing rule in the node; the second processing rule being applied in case of a load on the control device being high; the second processing rule providing for contents of processing of suppressing a processing rule setting request in case of receiving an unknown packet belonging to none of existing flows.

(Mode 24)
A program executed by a computer forming a control device connected to a node that holds a first processing rule providing for contents of processing for a packet belonging to a preset flow and that processes an incoming packet matching to the processing rule; the program comprising:
a processing of setting in the node a first processing rule in response to a request from the node; and
a processing of setting a second processing rule in the node; the second processing rule being applied in case of a load on the control device being high; the second processing rule providing for contents of processing of suppressing a processing rule setting request in case of receiving an unknown packet belonging to none of existing flows.

The disclosure of the aforementioned Patent Literature and the Non Patent Literatures is incorporated herein by reference thereto. The particular exemplary embodiments or examples may be modified or adjusted within the gamut of the entire disclosure of the present invention, inclusive of claims, based on the fundamental technical concept of the invention. Further, a variety of combinations or selection of elements disclosed herein may be made within the framework of the claims. Viz., the present invention may cover a wide variety of modifications or corrections that may occur to those skilled in the art in accordance with the entire disclosure of the present invention, inclusive of claims and the technical concept of the present invention.

REFERENCE SIGNS LIST 100, 100A, 100B: control device (controller)
101: processing (handling) rule memory
103: topology management unit
104: path/action calculation unit
105: processing (handling) rule preparation unit
106: control message processor
107: node communication unit
108: statistic information collection unit
210 to 230: (network) nodes
211: packet processor
212: processing (handling) rule memory
2101: request staying unit

What is claimed is:

1. A communication system, comprising:
a plurality of nodes, each of said nodes on receipt of a packet referencing a table including a plurality of processing rules concerning packet processing, each of said nodes processing the packet received in accordance with at least one of said processing rules corresponding to the packet received, each of said nodes transmitting a processing rule setting request in case the corresponding processing rule is not known; and
a control device setting a packet processing rule in at least one of said nodes on receipt of said processing rule setting request;
wherein at least one of said nodes suspends a transmission of said setting request to the control device at a preset cycle, processes the packet received in accordance with a second processing rule that provides for packet processing for suspending said setting request to said control device,
at least one of said nodes holds a third processing rule in said table;
said third processing rule being applied with priority to said second processing rule and said third processing rule is prescribed to transmit a setting request to said control device,
said third processing rule provides for contents of processing that said setting request is to be transmitted on receipt of a packet for which a corresponding processing rule is not known; said third processing rule also provides a preset valid period thereof, and
said control device updates said third processing rule at a preset time interval.

2. The communication system according to claim 1, wherein
said at least one of said nodes processes the received packet in accordance with said second processing rule that provides for packet processing for suspending the transmission of said setting request to said control device.

3. The communication system according to claim 2, wherein,
said second processing rule provides for packet processing executed without dependency upon control by said control device.

4. The communication system according to claim 2, wherein
said at least one of said nodes holds in said table said second processing rule that provides for rewriting of a header of said received packet and for forwarding of said received packet to another one of said nodes,
at least one of said nodes also holding in said table a fourth processing rule that provides for packet processing executed without dependency upon control by said control device on receipt of the header-rewritten packet from said another node.

5. The communication system according to claim 1, wherein,
the valid period of said third processing rule is adjusted in response to the load on said control device.

6. The communication system according to claim 2, wherein,
said control device increases the number of nodes where said second processing rule is set in response to the load on the own device.

7. The communication system according to claim 2, wherein,
said control device monitors the load state of own control device;
said control device setting said second processing rule in said node in response to the load state of own control device.

8. The communication system according to claim 2, wherein,
at least one of said nodes monitors the load state of said control device;
said second processing rule being set in at least one of said nodes in response to said load state.

9. The communication system according to claim 1, wherein,
said control device changes the valid period of said third processing rule based upon the traffic information collected from said node or the packet received from said node.

10. The communication system according to claim 2, wherein,
said control device decides the node where said second processing rule is set or attribute of the packet as a subject of said second processing rule based upon the traffic information collected from said node or the packet received from said node.

11. The communication system according to claim 1, wherein,
a fifth processing rule is set in the node that transmitted said setting request; said fifth processing rule providing that said node that transmitted said setting request is to carry out discarding or queuing of succeeding packets of the same attribute as that of the received packet for a preset time period.

12. A control device that controls a plurality of nodes; each of said nodes on receipt of a packet referencing a table including a plurality of processing rules concerning packet processing; each of said nodes processing the packet received in accordance with at least one of said processing rules corresponding to the packet received;
said control device comprising at least one processor and a memory that:
receives a processing rule setting request transmitted from the node that received a packet the corresponding processing rule of which is not known;
sets, on receipt of said setting request, the processing rule for the packet for at least one of said nodes;
transmits to at least one of said nodes a command to suspend a transmission of said setting request to said control device;
transmits to at least one of said nodes a command for suspending the transmission of said setting request to said control device at a preset cycle;
transmits to at least one of said nodes a command to processes the packet received in accordance with a second processing rule that provides for packet processing for suspending said setting request to said control device;
sets a third processing rule in at least one of said nodes; said third processing rule being applied with priority to said second processing rule and said third processing rule is prescribed to transmit a setting request to said control device; and
updates said third processing rule at a preset time interval,
wherein said third processing rule provides for contents of processing that said setting request is to be transmitted on receipt of a packet for which a corresponding processing rule is not known; said third processing rule also provides a preset valid period thereof.

13. The control device according to claim 12, wherein said control device sets, in at least one of said nodes, a second processing rule providing for packet processing of suspending the transmission of said setting request to said control device.

14. The control device according to claim 13, wherein, said second processing rule prescribes packet processing executed without dependency upon the control by said control device.

15. The control device according to claim 13, wherein said control device:
sets said second processing rule in at least one of said nodes; said second processing rule providing for rewriting of a header of said received packet and for forwarding of said header-rewritten packet to another one of said nodes; and
sets, in at least one of said nodes, a fourth processing rule on receipt of said header-rewritten packet from said another one of said nodes; said fourth processing rule providing for packet processing executed without dependency upon the control by said control device.

16. The control device according to claim 12, wherein said control device adjusts the valid period of said third processing rule in response to a load state in said control device.

17. The control device according to claim 13, wherein said control device increases the number of nodes where said second processing rule is set in response to the load state of the control device.

18. The control device according to claim 13, wherein said control device:
monitors the load state of own control device; and
sets said second processing rule in said nodes in response to the load state of the own control device.

19. The control device according to claim 12, wherein said control device changes the valid period of said third processing rule based upon the traffic information collected from said node or the packet received from said node.

20. The control device according to claim 13, wherein said control device decides the node where said second processing rule is set or the attributes of a packet as a subject of said second processing rule, based upon the traffic information collected from said node or the packet received from said node.

21. The control device according to claim 12, wherein,
a fifth processing rule is set in the node that transmitted said setting request; said fifth processing rule providing that said node that transmitted said setting request is to carry out discarding or queuing of succeeding packets of the same attribute as that of the packet received for a preset time period.

22. A communication method, in which a packet is processed based upon control by a control device that decides a forwarding path for said packet, said communication method comprising:
referencing, on receipt of the packet, a table including a plurality of processing rules concerning packet processing;
processing the packet received in accordance with at least one of said processing rules corresponding to the packet received and transmitting a processing rule setting request to said control device in case the corresponding processing rule is not known;
suspending a transmission of said setting request to the control device at a preset cycle;
processing the packet received in accordance with a second processing rule that provides for packet processing for suspending said setting request to said control device;

providing, in accordance with a third processing rule for a preset valid period, for said setting request to be transmitted on receipt of a packet a corresponding processing rule for which is not known; and updating said third processing rule at a preset time interval.

23. A communication node, in which a packet is processed based upon control by a control device that decides a forwarding path for said packet, said communication node comprising at least one processor and memory that:

references, on receipt of the packet, a table including a plurality of processing rules concerning packet processes, processing the packet received in accordance with at least one of said processing rules corresponding to the packet received and transmits a processing rule setting request to said control device in case the corresponding processing rule is not known;

receives the setting of the processing rule for said setting request from said control device; and suspends a transmission of said setting request to the control device at a preset cycle, and processes and processes the packet received in accordance with a second processing rule that provides for packet processing for suspending said setting request to said control device, wherein the communication node holds a third processing rule in said table; said third processing rule being applied with priority to said second processing rule and said third processing rule is prescribed to transmit a setting request to said control device, said third processing rule provides for contents of processing that said setting request is to be transmitted on receipt of a packet for which a corresponding processing rule is not known; said third processing rule also provides a preset valid period thereof, and said third processing rule is updated at a preset time interval.

24. A non-transitory computer-readable storage medium storing a program that allows a control device, controlling a plurality of nodes, to reference a table including a plurality of processing rules concerning packet processing, on receipt of a packet, and to process the received packet in accordance with at least one of said processing rules corresponding to said packet received; said program allowing said control device to execute a plurality of processes, comprising:

a processing of receiving the processing rule setting request transmitted from a node that received the packet, a corresponding processing rule for which is not known;

a processing of setting the packet processing rule in at least one of said nodes in case of receiving said setting request;

a processing of transmitting to at least one of said nodes a command to suspend a transmission of said setting request to said control device;

a processing of transmitting to at least one of said nodes a command for suspending the transmission of said setting request to said control device at a preset cycle, and processes the packet received in accordance with a second processing rule that provides for packet processing for suspending said setting request to said control device;

a processing of setting a third processing rule in at least one of said nodes; said third processing rule being applied with priority to said second processing rule and said third processing rule is prescribed to transmit a setting request to said control device; and a processing of updating said third processing rule at a preset time interval, wherein said third processing rule provides for contents of processing that said setting request is to be transmitted on receipt of a packet for which a corresponding processing rule is not known; said third processing rule also provides a preset valid period thereof.

25. A network system, comprising:

a plurality of network nodes to refer to a table including a plurality of packet handling rules, and to handle an incoming packet with at least one of the packet handling rules, the one or more rules corresponding to the incoming packet; and a control device to set a new packet handling rule to at least one of the network nodes when the control device receives an inquiry from a network node which receives a first packet that a corresponding rule is not included in the table, wherein at least one of the network nodes is configured to suspend the inquiry to the control device at a preset cycle, process the packet received in accordance with a second processing rule that provides for packet processing for suspending said setting request to said control device, and hold a third processing rule in said table; said third processing rule being applied with priority to said second processing rule and said third processing rule is prescribed to transmit a setting request to said control device, said third processing rule provides for contents of processing that said setting request is to be transmitted on receipt of a packet a corresponding processing rule for which is not known; said third processing rule also provides a preset valid period thereof, and said control device updates said third processing rule at a preset time interval.

26. The communication system according to claim 1, wherein said at least one of the network nodes suspends a transmission of said setting request to said control device in response to the load detected on said control device from a load monitor.

* * * * *